United States Patent
Kurapati et al.

(10) Patent No.: US 6,499,029 B1
(45) Date of Patent: Dec. 24, 2002

(54) USER INTERFACE PROVIDING AUTOMATIC ORGANIZATION AND FILTERING OF SEARCH CRITERIA

(75) Inventors: Kaushal Kurapati, Yorktown Heights, NY (US); Lira Nikolovska, Einhoven (NL); Jacquelyn A. Martino, Col Spring, NY (US); Alison F. Camplin, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/537,828

(22) Filed: Mar. 29, 2000

(51) Int. Cl.[7] ............................................. G06F 17/30
(52) U.S. Cl. ............................. 707/5; 707/7; 707/10; 707/104.1
(58) Field of Search ........................ 707/2, 3, 4, 5, 707/7, 10, 102, 104.1, 531

(56) References Cited

U.S. PATENT DOCUMENTS

| | | | |
|---|---|---|---|
| 5,544,360 A | 8/1996 | Lewak et al. | 395/600 |
| 5,737,734 A | 4/1998 | Schultz | 707/5 |
| 5,754,939 A | 5/1998 | Herz et al. | 455/4.2 |
| 5,945,988 A | 8/1999 | Williams et al. | 345/327 |
| 5,946,678 A * | 8/1999 | Aalbersberg | 707/3 |
| 5,987,446 A * | 11/1999 | Corey et al. | 707/3 |
| 6,005,565 A * | 12/1999 | Legall et al. | 345/327 |
| 6,008,802 A | 12/1999 | Iki et al. | 345/327 |
| 6,018,372 A | 1/2000 | Etheredge | 348/569 |
| 6,130,726 A | 10/2000 | Darbee et al. | 348/734 |
| 6,133,909 A * | 10/2000 | Schein et al. | 345/327 |
| 6,249,773 B1 * | 6/2001 | Allard et al. | 705/26 |
| 6,317,741 B1 * | 11/2001 | Burrows | 707/5 |
| 6,326,962 B1 * | 12/2001 | Szabo | 345/348 |
| 2001/0039659 A1 | 11/2001 | Simmons et al. | 725/61 |

FOREIGN PATENT DOCUMENTS

| | | | |
|---|---|---|---|
| EP | 0774866 | 5/1997 | H04N/5/44 |
| EP | 0774868 | 5/1997 | H04N/7/173 |
| WO | WO9406248 | 3/1994 | H04N/13/04 |
| WO | WO9748230 | 12/1997 | H04N/7/00 |
| WO | WO9821878 | 5/1998 | |

* cited by examiner

*Primary Examiner*—Sam Rimell
*Assistant Examiner*—Jacques Veillard
(74) *Attorney, Agent, or Firm*—Gregory L. Thorne

(57) ABSTRACT

A user interface for querying and displaying records from a database employs a physical metaphor for the process of constructing queries and viewing results. The criteria are represented in displays as symbols that can be included in a query. The display of the symbols are ranked in terms of their respective utility, where the utility is inferred from the commands received to generate the queries. In one embodiment, the ranking is based on frequency of use. The ranking may be indicated by various display effects. For example, in an embodiment, the search criteria are indicated as strings of beads in a three-dimensional scene, each bead representing a criterion and each string representing a different category. For example the criteria, drama, action, suspense, and horror may be included in a category of genre. Criteria are selected to form a query by moving corresponding beads to a query string which is then submitted to perform the search. Those beads that correspond to highly ranked criteria are shown in the foreground of the scene and those that correspond to lesser ranked criteria are shown in the background. The beads can be rotated from background to foreground with suitable commands.

21 Claims, 17 Drawing Sheets

USER INTERFACE PROVIDING AUTOMATIC ORGANIZATION AND FILTERING OF SEARCH CRITERIA

BACKGROUND OF THE INVENTION

The present invention relates to search, retrieval, and organization of data from large data spaces such as the contents of CD ROMS, electronic program guides, the Internet, etc.

The vast amount of information available in CD-ROMS, the Internet, television programming guides, the proposed national information infrastructure, etc. spur the dream of easy access to many large information media sources. Such increased access to information is likely to be useful, but the prospect of such large amounts of information presents new challenges for the design of user interfaces for information access. For example, Internet users often struggle to find information sources or give up in the face of the difficulty of constructing search queries and visualizing the results of queries. Straight text lists such as provided by electronic program guides, Internet search engines, and text search tools such as Folio®, are tedious to work with, often hard to work with, and, because of the rather monotonous look, rather tiring to look at for long periods of time.

There are two major components to searching databases: filtering so irrelevant information is excluded, and sorting the filtered results by some priority schema. For example, an Internet search engine such as Google® uses a text query to filter and sort records in its database representing entry points in the World-Wide-Web. It uses certain implicit criteria such as an implied vote "cast" by pages that link to the candidates retrieved by the query (That is, pages that are linked to by more other pages, have more "votes"). Google also analyzes the pages that cast the votes and gives greater weight to pages that receive more votes by other pages.

Tools such as Google and most other database retrieval tools accept search queries in the form of text with connectors and results are presented in the form of lists sorted by some specific lump criterion which might be an operator involving multiple criteria (such as sort by A, then by B, etc).

SUMMARY OF THE INVENTION

Briefly, a user interface for querying and displaying records from a database employs a physical metaphor for the process of constructing queries and viewing results. The criteria are represented in displays as symbols that can be included in a query. The display of the symbols are ranked in terms of their respective utility, where the utility is inferred from the commands received to generate the queries. In one embodiment, the ranking is based on frequency of use. The ranking may be indicated by various display effects. For example, in an embodiment, the search criteria are indicated as strings of beads in a three-dimensional scene, each bead representing a criterion and each string representing a different category. For example the criteria, drama, action, suspense, and horror may be included in a category of genre. Criteria are selected to form a query by moving corresponding beads to a query string which is then submitted to perform the search. Those beads that correspond to highly ranked criteria are shown in the foreground of the scene and those that correspond to lesser ranked criteria are shown in the background. The beads can be rotated from background to foreground with suitable commands.

The UI design addresses various problems with user interaction with database search devices in the "lean-back" environment. (In the "lean back" situation the user is being entertained and relaxes as when the user watches television, and in the "lean-forward" situation the user is active and focused as when the user uses a desktop computer.) For example, the invention may be used to interact with electronic program guides (EPGs) used with broadcast television. In such an application, the UI may be displayed as a layer directly on top of the recorded or broadcast program or selectively on its own screen. The UI may be accessed using a simple handheld controller. In a preferred embodiment, the controller has vertical and horizontal scroll buttons and only a few specialized buttons to access the various operating modes directly.

The UI generates three environments or worlds: a search world, a profiling world, and an overview world. Assuming an EPG environment, in the search world, the user enters, saves, and edits filtering and sorting criteria (time of day, day of week, genre, etc.). In the profiling world, the user generates and modifies explicit (and some types of implicit) user profiles. Explicit profiles are the set of likes and dislikes a user has entered to represent his preferences. Each can be selected from lists of criteria such as genre (movies, game shows, educational, etc.), channel (ABC, MTV, CSPAN, etc.), actors (Jodie Foster, Tom Cruise, Ricardo Bernini, etc.), and so on. In the overview world, the user views and selects among the results of the search, which is a result of the sorting, filtering, and profiling information.

The invention may be used in connection with various different searching functions. For example, in a preferred embodiment designed around EPGs, there are three basic searching functions provided: (1) Filtering, (2) Filtering and/or sorting by explicit profile, and (3) Sorting by implicit profile. These are defined as follows.

(1) Filtering—A set of criteria that defines the set of results to be displayed. These criteria choose exactly what records in the database will be chosen and which will be excluded from the overview world display.

(2) Filtering and/or sorting by explicit profile—A user is permitted to specify likes or dislikes by making selections from various categories. For example, the user can indicate that dramas and action movies are favored and that certain actors are disfavored. These criteria are then applied to sort the records returned by the filtering process. The degree of importance of the criteria may also be specified, although the complexity of adding this layer may make its addition to a system less worthwhile for the vast majority of users.

As an example of the second type of system, one EP application (EP 0854645A2) describes a system that enables a user to enter generic preferences such as a preferred program category, for example, sitcom, dramatic series, old movies, etc. The application also describes preference templates in which preference profiles can be selected, for example, one for children aged 10–12, another for teenage girls, another for airplane hobbyists, etc. This method of inputting requires that a user have the capacity to make generalizations about him/herself and that these be a true picture of his/her preferences. It can also be a difficult task for common people to answer questions about abstractions such as: "Do you like dramas or action movies?" and "How important is the drama, criteria to you?"

(3) Sorting by implicit profile—This is a profile that is generated passively by having the system "observe" user behavior. The user merely makes viewing (recording, downloading, or otherwise "using") choices in the normal fashion and the system gradually builds a personal preference database by extracting a model of the user's behavior from the choices. This process can be enhanced by permitting the user to rate material (for example on a scale of one to five stars). The system uses this model to make predictions about what the user would prefer to watch in the future. The process of extracting predictions from a viewing history, or specification of degree of desirability, can follow simple algorithms, such as marking apparent favorites after repeated requests for the same item. It can be a sophisticated machine-learning process such as a decision-tree technique with a large number of inputs (degrees of freedom). Such models, generally speaking, look for patterns in the user's interaction behavior (i.e., interaction with the UI for making selections).

An example of this type of profile information is MbTV, a system that learns viewers' television watching preferences by monitoring their viewing patterns. MbTV operates transparently and builds a profile of a viewer's tastes. This profile is used to provide services, for example, recommending television programs the viewer might be interested in watching. MbTV learns about each of its viewer's tastes and uses what it learns to recommend upcoming programs. MbTV can help viewers schedule their television watching time by alerting them to desirable upcoming programs, and with the addition of a storage device, automatically record these programs when the viewer is absent.

MbTV has a Preference Determination Engine and a Storage Management Engine. These are used to facilitate time-shifted television. MbTV can automatically record, rather than simply suggest, desirable programming. MbTV's Storage Management Engine tries to insure that the storage device has the optimal contents. This process involves tracking which recorded programs have been viewed (completely or partially), and which are ignored. Viewers can "lock" recorded programs for future viewing in order to prevent deletion. The ways in which viewers handle program suggestions or recorded content provides additional feedback to MbTV's preference engine which uses this information to refine future decisions.

MbTV will reserve a portion of the recording space to represent each "constituent interest." These "interests" may translate into different family members or could represent different taste categories. Though MbTV does not require user intervention, it is customizable by those that want to fine-tune its capabilities. Viewers can influence the "storage budget" for different types of programs. For example, a viewer might indicate that, though the children watch the majority of television in a household, no more than 25% of the recording space should be consumed by children's programs.

Note that search criteria, and implicit and explicit profiles, may produce reliability or ranking estimates for each proposed record in the searched database rather than just "yes" and "no" results for each candidate record in the database. A search query can be treated as providing criteria, each of which must be satisfied by the search results. In this case, if a query contains a specified channel and a specified time range, then only records satisfying both criteria will be returned. The same search query could be treated as expressing preferences in which case, records that do not satisfy both criteria could be returned, and, instead of filtering, the records are sorted according to how good a match they are to the criteria. So, records satisfying both criteria would be ranked highest, records satisfying only one criterion would be ranked second-highest, and records satisfying neither criterion would be ranked last. Intermediate ranking could be performed by the closeness of the record criterion to the query or profile criterion. For example, in the example above, if a record is closer to the specified time range, it would be ranked higher than a record that further in time from the specified time range.

In the case of implicit profiles, there may not be any criteria at all in the sense that one could show how high each genre, for example, is ranked. If, for example, a neural network-based predicting engine were used to sort the records of the database, there is no clear way to expose the criteria weighting that is used to make the decisions, at least for an easy-to-use system. However, some simpler machine learning techniques may also be used for producing and implementing implicit profiles. For example, the criteria appearing in selected records (or records ranked highly as highly desirable) can be scored based on the frequency of criteria hits. For example, in an EPG, if all the programs that are selected for viewing are daytime soaps, the soap genre and daytime time range would have a high frequency count and the science documentary genre would have zero hits. These could be exposed so that the viewer can see them. In the user interface embodiments described below, in which profiles are edited, the user may edit such an implicit profile because it is based, on specific weights applied to each criterion. A user can remove the criterion from the profile, change the weighting, etc. The latter is only an example of an implicit profiling mechanism that provides a clear way for the user to modify it. Other mechanisms may also provide such a scheme; for example the system need not be based only on frequency of hits of the user's selections.

Construction of the queries for filtering and preference application is preferably done with three dimensional visual graphics to facilitate the organization of information and to allow users to manipulate elements of a scene ("tokens" ) that represent data records, search and sort criteria, etc. In a preferred UI, the tokens take the form of beads. Categories are represented as strings or loops of beads. When a preference filter is constructed, specific choices (beads) are taken from a category string and added to a search string or bin. The beads, strings, and bins are represented as three-dimensional objects, which is more than just for appearances in that it serves as a cue for the additional meaning that the third dimension provides: generally an object's proximity to the user represents its relative ranking in the particular context.

In the environment of generating search queries, the ranking of search criteria may be defined by frequency with which those criteria are used. For example, if only certain channels are used with any frequencies, the channel category may show those channels in the foreground and the other ones in the background or even hidden from view. Of course all criteria may be accessible, but in most instances, extra steps may be required such as bringing the background objects into the foreground. This allows the scene to remain uncomplicated visually. For another example, if the user's searches always include the daytime time range, the bead or beads corresponding to this time range would be ranked higher.

One or more categories may actually be constructed of words, for example keywords, that appear in a large proportion of the chosen programs or a large proportion of the hits returned by the user's queries. This makes sense because requiring the keyword category to contain every conceivable keyword would be awkward. Extracting the significant-keywords from the descriptions of chosen records and/or from records returned by the queries based on frequency of occurrence or a variation thereof, makes the number of possible keywords easier to handle and easier to select. Preferably, the keyword list should be editable by the user in the same fashion as described in detail with respect to the editing of profiles elsewhere in the specification. To construct a keyword list based on frequency of use data, the system could start with no keywords at all. Then, each time the user enters a query, the returned results could be scanned for common terms. The titles, descriptions, or any other data could be scanned and those terms that occur with some degree of frequency could be stored in a keyword list. The keywords in the list could each be ranked based on frequency or frequency weighted by the context in which the keyword appeared. For example, a keyword in a title might receive a lower rank than a keyword in a description or a keyword that is a direct object or subject in a grammatical parsing of a sentence in a description might receive a higher ranking than indirect objects, etc. Instead of extracting keywords from the returned records of a search, the keywords could be extracted from only the records selected for use. For example, only programs that are chosen for viewing or recording are actually used to form the keyword list in the manner described. Alternatively both selections and returns of queries could be used, but the keywords in the selected records could be weighted more strongly than keywords in other returned records.

The overview world presents the results of filtering and sorting criteria in a visually clear and simple way. Preferably, a three-dimensional animation is shown with three-dimensional tokens representing each record. Again, the (apparent) closeness of the token to the user represents the prediction of how much the user, according to the selections that are active, would prefer the item identified by the record. That is, proximity, initially, represents goodness of fit. In one example of this, the bead strings, each bead representing a record, are shown axially aligned with the string with the best fits being arranged closest to the user and the others receding into the background according to their degree of fit. The user can advance in an axial direction to search through the results as if walking through a tunnel. A pointer can be moved among the beads to select them. This causes additional information about each to be exposed.

The implicit and explicit user profiles are invoked by adding them to the search queries (the bin or string) just as done with other choices. The effect of adding the profile is to have results sorted according to the preferences. Explicit user profiles are generated in the same way.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
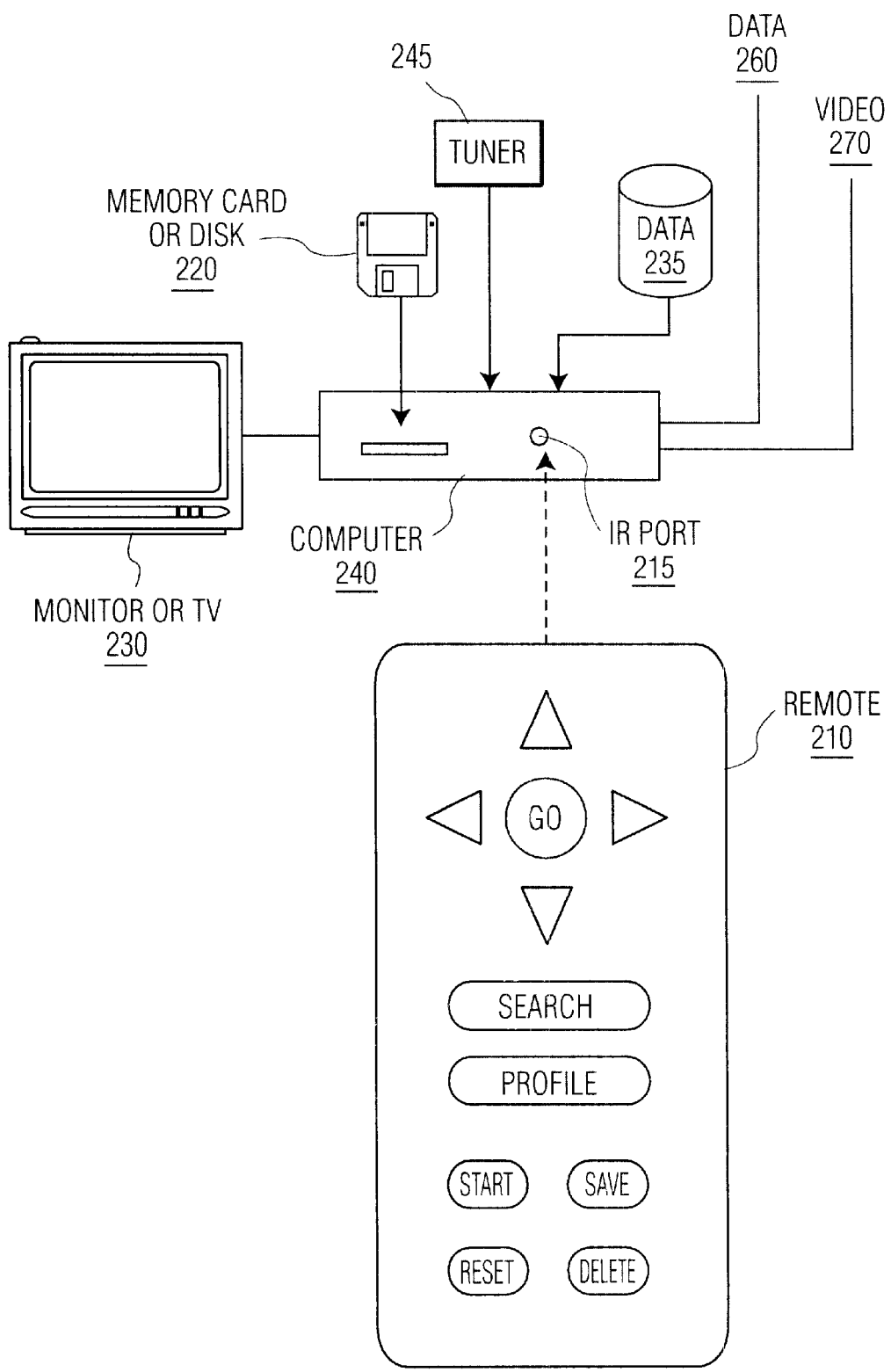
FIG. 1 is an illustration of a hardware system that may be used to implement an embodiment of the invention.

Referring to FIG. 1, the invention relates to database search and retrieval and is particularly suited to lean back environments or applications where the availability of training is, or is desired to be, limited. For example, the invention may be used in connection with search and visualization tasks in connection with electronic program guides (EPGs). In the context of televisions, EPG is applied loosely to various features that can be delivered using a database of program information. The program information may include titles and various descriptive information such as a narrative summary, various keywords categorizing the content, etc. In an embodiment, a computer sends program information to a television 230. The computer 240 may be equipped to receive the video signal 270 and control the channel-changing function, and to allow a user to select channels through a tuner 245 linked to the computer 240 rather than through the television's tuner 230. The user can then select the program to be viewed by highlighting a desired selection from the displayed program schedule using the remote control 210 to control the computer. The computer 240 has a data link 260 through which it can receive updated program schedule data. This could be a telephone line connectable to an Internet service provider or some other suitable data connection. The computer 240 has a mass storage device 235, for example a hard disk, to store program schedule information, program applications and upgrades, and other information. Information about the user's preferences and other data can be uploaded into the computer 240 via removable media such as a memory card or disk 220. A great many interesting features are enabled by appropriately programming the computer 240.

Note that many substitutions are possible in the above example hardware environment and all can be used in connection with the invention. The mass storage can be replaced by volatile memory or non-volatile memory. The data can be stored locally or remotely. In fact, the entire computer 240 could be replaced with a server operating offsite through a link. Rather than using a remote control to send commands to the computer 240 through an infrared port 215, the controller could send commands through a data channel 260 which could be separate from, or the same as, the physical channel carrying the video. The video 270 or other content can be carried by a cable, RF, or any other broadband physical channel or obtained from a mass storage or removable storage medium. It could be carried by a switched physical channel such as a phone line or a virtually switched channel such as ATM or other network suitable for synchronous data communication. Content could be asynchronous and tolerant of dropouts so that present-day IP networks could be used. Further, the content of the line through which programming content is received could be audio, chat conversation data, web sites, or any other kind of content for which a variety of selections are possible. The program guide data can be received through channels other than the separate data link 260. For example, program guide information can be received through the same physical channel as the video or other content. It could even be provided through removable data storage media such as memory card or disk 220. The remote control 210 can be replaced by a keyboard, voice command interface, 3D-mouse, joystick, or any other suitable input device. Selections can be made by moving a highlighting indicator, identifying a selection symbolically (e.g., by a name or number), or making selections in batch form through a data transmission or via removable media. In the latter case, one or more selections may be stored in some form and transmitted to the computer 240, bypassing the display 170 altogether. For example, batch data could come from a portable storage device (e.g. a personal digital assistant, memory card, or smart card). Such a device could have many preferences stored on it for use in various environments so as to customize the computer equipment to be used.

Figure 2:
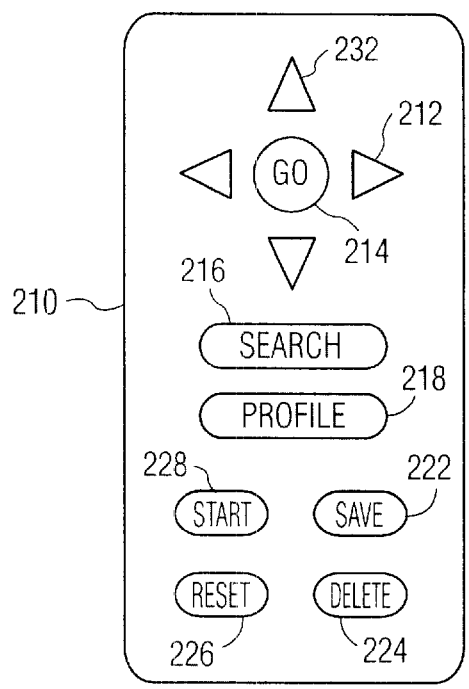
FIG. 2 is an illustration of a remote control that may be used with an electronic program guide embodiment of the invention.

Referring now to FIG. 2, a remote controller that may be used with a EPG embodiment of the invention has a simple set of keys including vertical and horizontal cursor keys 232 and 212, respectively. A select, "GO," button 214 is used to trigger actions depending on the context in which it is pressed. A search key 216 is used to invoke a search UI element, described below. A profile key is used to invoke a profile UI element described below. Start, save, reset, and delete keys 229, 222, 226, and 224 respectively, are used to control specific operations depending on context as described below.

Figure 3:
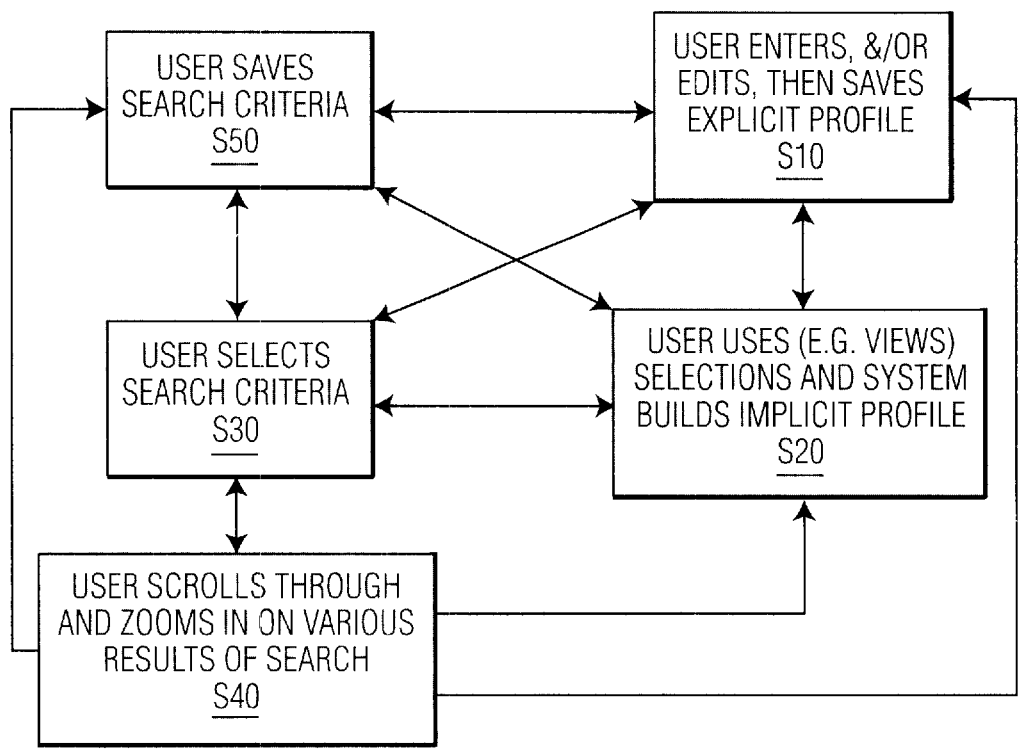
FIG. 3 is a flowchart illustrating various processes encompassed by the inventive user-interface.
Figure 4:
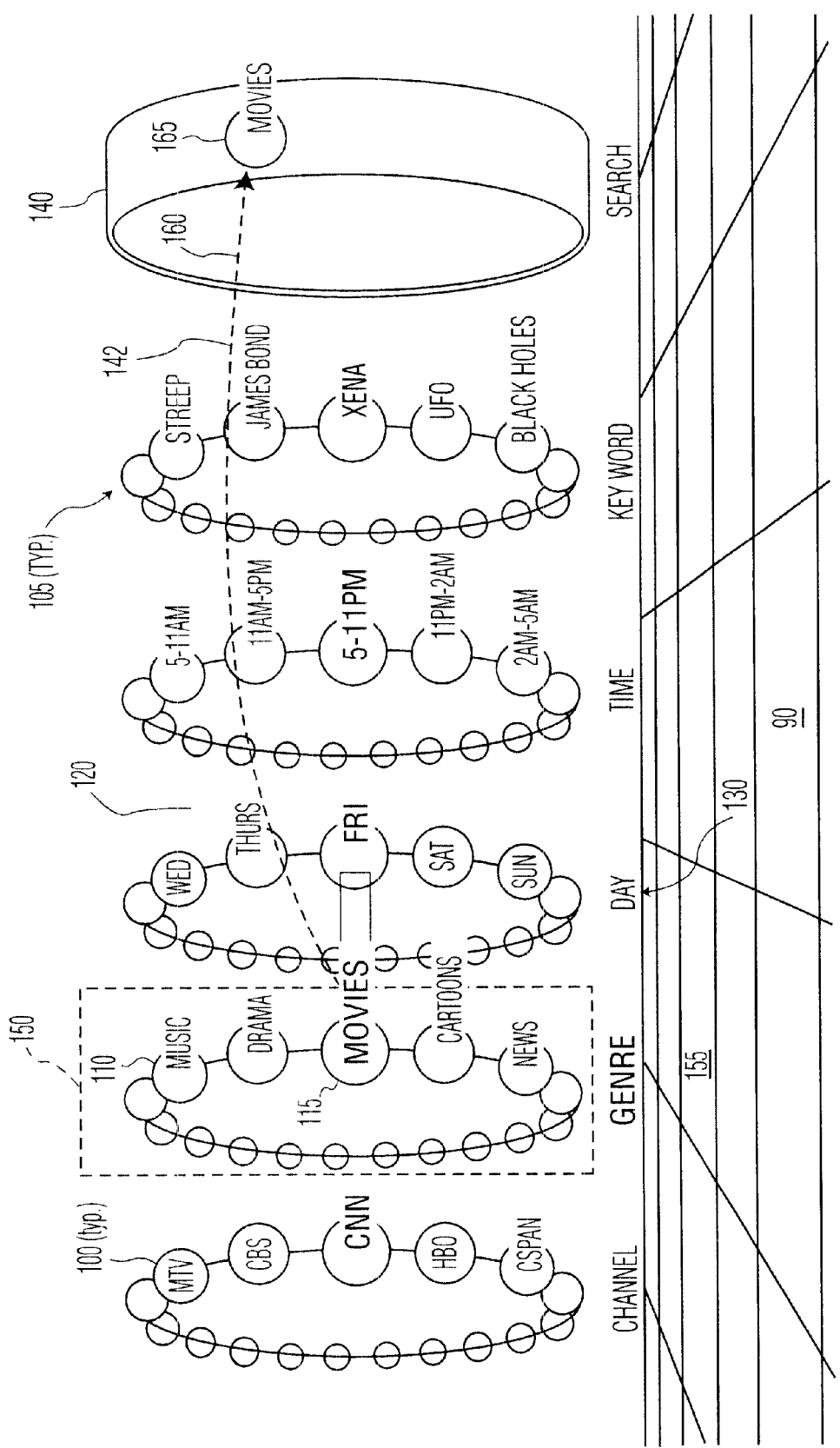
FIG. 4 is an illustration of a user interface for forming and editing a search query.

Referring now to FIG. 3, a general overview of a user's interaction with the overall UI, which comprises search, profile, and overview worlds, may begin with the construction of an explicit profile in step S10. Referring now also to FIG. 4, for example, using a search/profile tool 90, criteria are selected by selecting a token 105 (typ.) (here represented by a bead), for example, representing the genre "Movies" and moving them to an icon representing a selection bin 140. Before they are selected, each criterion is grouped using a bead string visual element, for example the Genre string 155, where each group of criteria resides on a particular string. When a criterion is selected, the corresponding token 105 is highlighted in some way, such as by bolding or color change. In addition, further informatin relating to the selected criterion token may be revealed. For example, the Movies bead 165 was selected. Selected tokens are shown in the foreground of the three-dimensional scene permitting more information to be shown clearly on the screen. The Movies bead 165 in this example has been moved from the Genre string 155 to the selection bin 140. The place occupied by the Movies bead 165 is marked by a ghosted bead 115 after its transfer to the selection bin 140. In the UI, it is envisioned that any of the beads may be selected and transferred to the selection bin 140.

The search/profile tool may be navigated as follows. When the user is in the search area, the user can see all the category labels 130 (typ.). The categories may be chosen using the cursor keys 212, 232. In the figure, the Genre string 155 may have been selected using the horizontal cursor keys 212, as indicated by suitable highlighting 150 or any other appropriate device such as changing a color of the selected string, bolding or highlighting the characters of the genre label 155, increasing the character size, etc. When the desired string has been selected, the GO key may be pressed to permit selection of beads on the selected string.

Note that, alternatively, the beads of non-selected strings may be hidden and only a vestige displayed to indicate the presence of the category. Also, when the selected category reaches the far left or far right of the screen, the strings can be rolled in the opposite direction to reveal more strings. Alternatively, the selected category may remain at the center of the screen and each time a horizontal scroll key 212 is pressed, the set of strings rolls in the opposite direction bringing a new string into view.

To navigate a selected string, the user may simply use the vertical cursor keys 232. This may have the effect of moving the selected bead up and down or of rotating the entire string so the center one is always the selected one. In either case, the bead strings can be arbitrarily long and continued downward or upward cursor guided movement results in the feeding of the string in the appropriate direction to reveal more beads.

Note that in an embodiment, multiple strings may be open and the vertical and horizontal cursor keys 212 and 232 may be used to navigate among them without reselecting any strings. When a bead is selected, it can be moved to the search bin 140 by pressing the GO button 214. For example, the Movies bead in FIG. 4 was selected and the GO button 214 was pressed causing it to be moved into the search/profile bin 140 as indicated by the dotted arrow 142. To remove a bead from the search/profile bin 140, the user performs some action to move the selector to the search/profile bin 140 and selects the bead to be removed. Then the GO button 214 is pressed which causes the selected bead to retreat to the string from which it came. A fast way to clear all beads from the search bin 140 is to use the reset button 226.

Note that the search/profile bin 140 is labeled "Search" in FIG. 4. This indicates that the mode the user is currently in. Also, the basic appearance and workings of the UI when in profile mode are the same as in the search mode. However, in profile mode, the user is given the option of indicating whether a criterion is liked or disliked. Also, in search mode, a certain set of categories may be provided. One is searches that have been saved and another is profiles. These are explained later.

Figure 5:
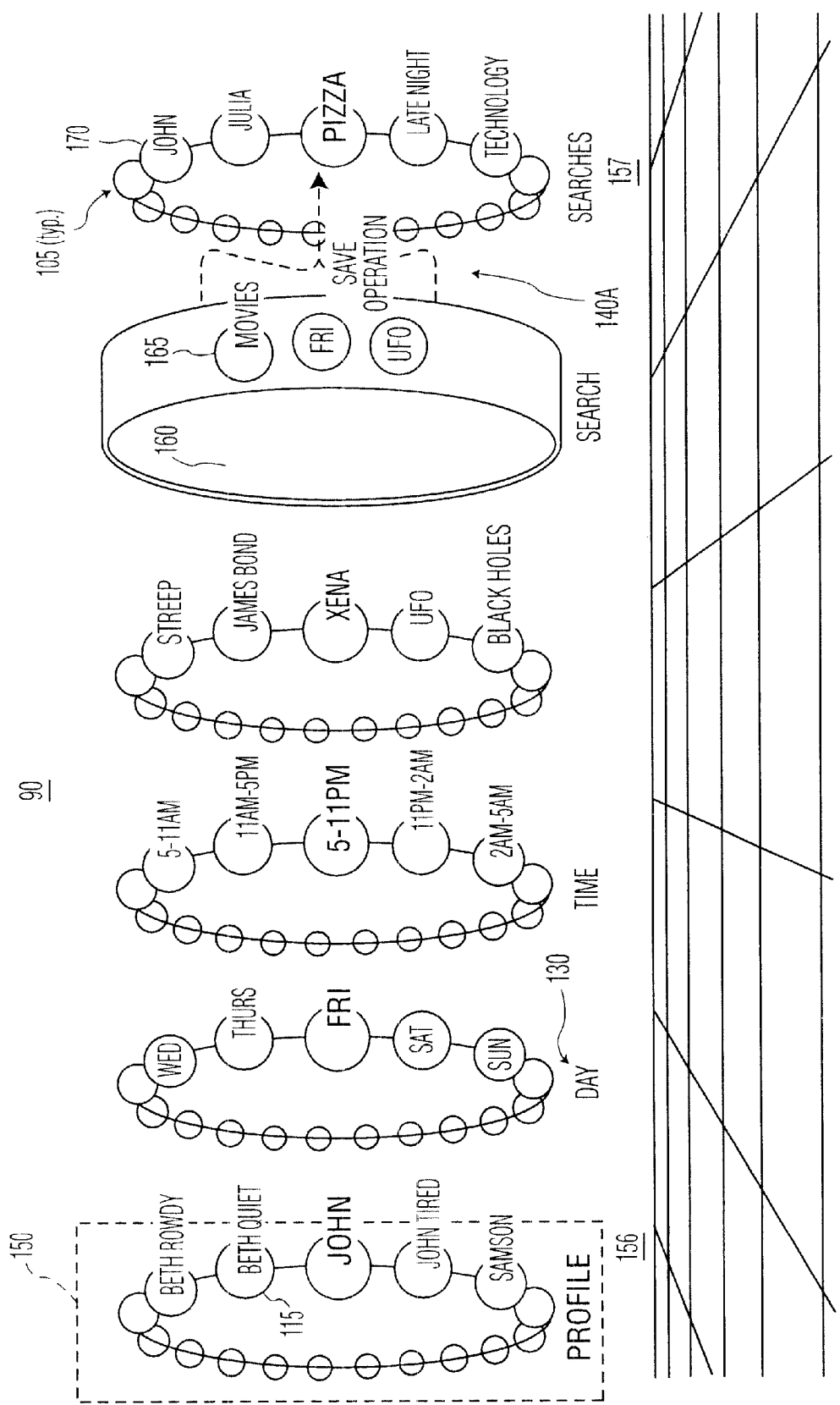
FIG. 5 is an illustration of a user interface for forming and editing a user profile.

Referring now also to FIG. 5, a search string 157 may be provided as a category in the search mode UI or in a specialized screen. The advantage of the former is that it reminds the user of the availability of the saved searches. Saved searches can be shown on a string adjacent the search/profile bin 140. Another special category that may be presented, and preferably is presented, in search mode is the profile category. This may be shown as a bead string also.

After a search is created, it may be executed using the start button 228 to see the results of the search, or it may be saved, as indicated at 140A, and given a name by pressing the save button 222. Naming the search can be performed using known UI elements such as a cursor-key navigable on-screen keyboard such as provided with Tivo® personal digital video recorder devices. For example, the name "Pizza" could be given to identify a search that applies for Thursday night pizza parties.

A Previously saved search can be accessed or edited as follows. To access the string, the user can use the cursor keys 212,214 or by pressing or holding down the search button 216 while in the search mode or any other means. This will highlight the search string 157. Then the search beads 170 can be navigated as discussed above until the desired one is highlighted (or, equivalently, rolled to the foreground). When the desired search bead is highlighted, the beads making up the criteria defining the selected search bead appear in the search/profile bin 140. To apply the criteria defined in the selected search bead, the user may immediately hit the start button 228 or the user can move to the search bin 140 and edit the search criteria by deleting them or adding new ones just as in the construction of a search. When the save button 222 is pressed in this context, however, the user is permitted to save it back to the original saved search bead or to a new one, allowing saved searches to be used as templates for new searches.

Note that, a search bead can be added to the search bin 140 along with new criteria before invoking using the start button 228 in the construction of a new search just like any other criterion bead. This, in effect, makes the saved search a template or starting point for searches, so a particular user does not have to enter the same data each time she/he performs a search.

Figure 6:
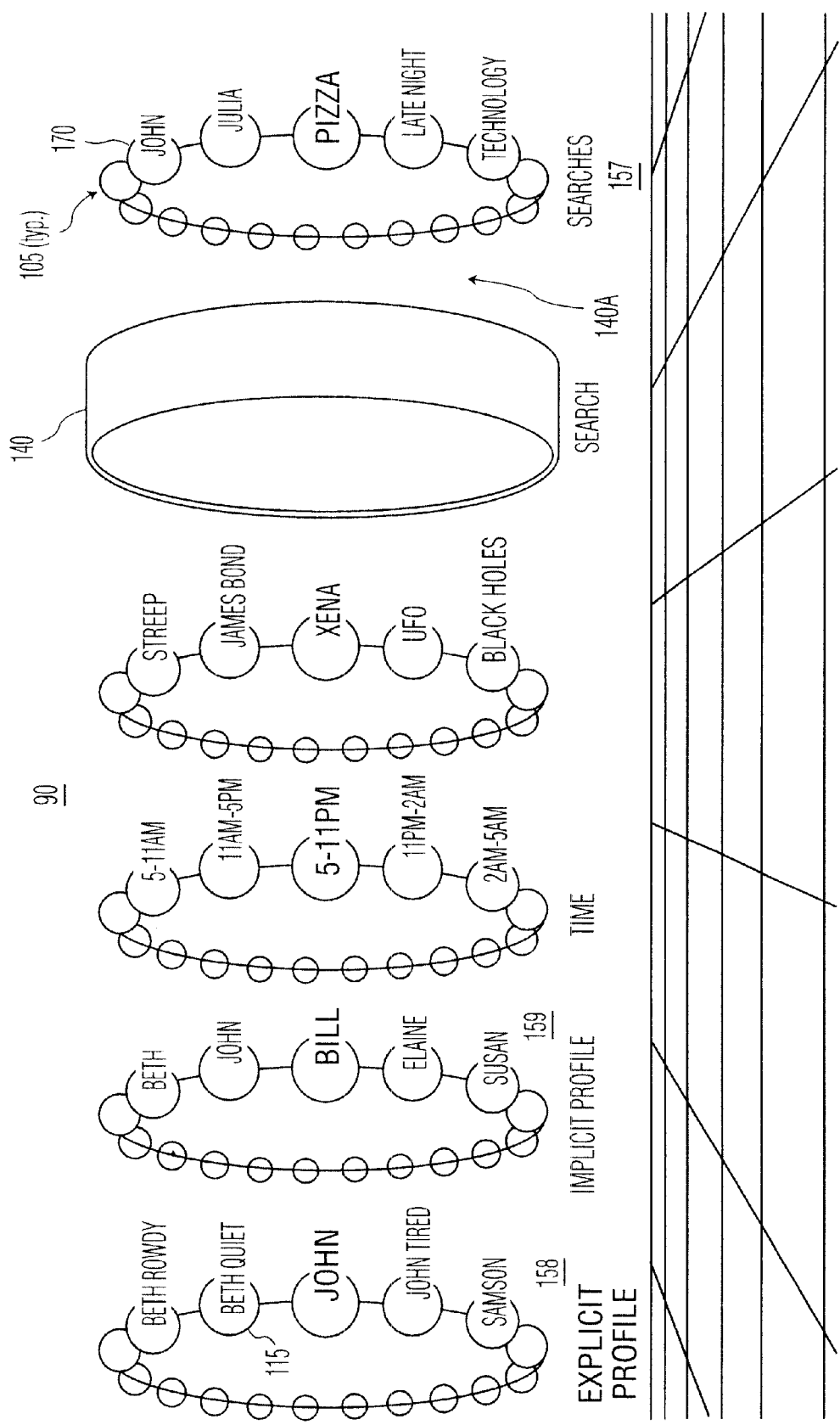
FIG. 6 is an illustration of a user interface for forming and editing a search query displaying explicit and implicit profiles as search criteria.

In the search mode, the user can also select beads from a profile string 156 to add to a search. Each bead of the profile string 156 contains a profile of a user. In an embodiment, the profile can be an implicit profile, an explicit profile, or a combination of these. The beads representing the profile may be added to a search to cause the results to be sorted by the preferences they embody. Referring now also to FIG. 6, implicit 158 and explicit 159 profiles can be displayed and accessed separately. In this embodiment, the profile beads are used independently, but added to the search bin 140 just as other criteria beads.

Figure 7:
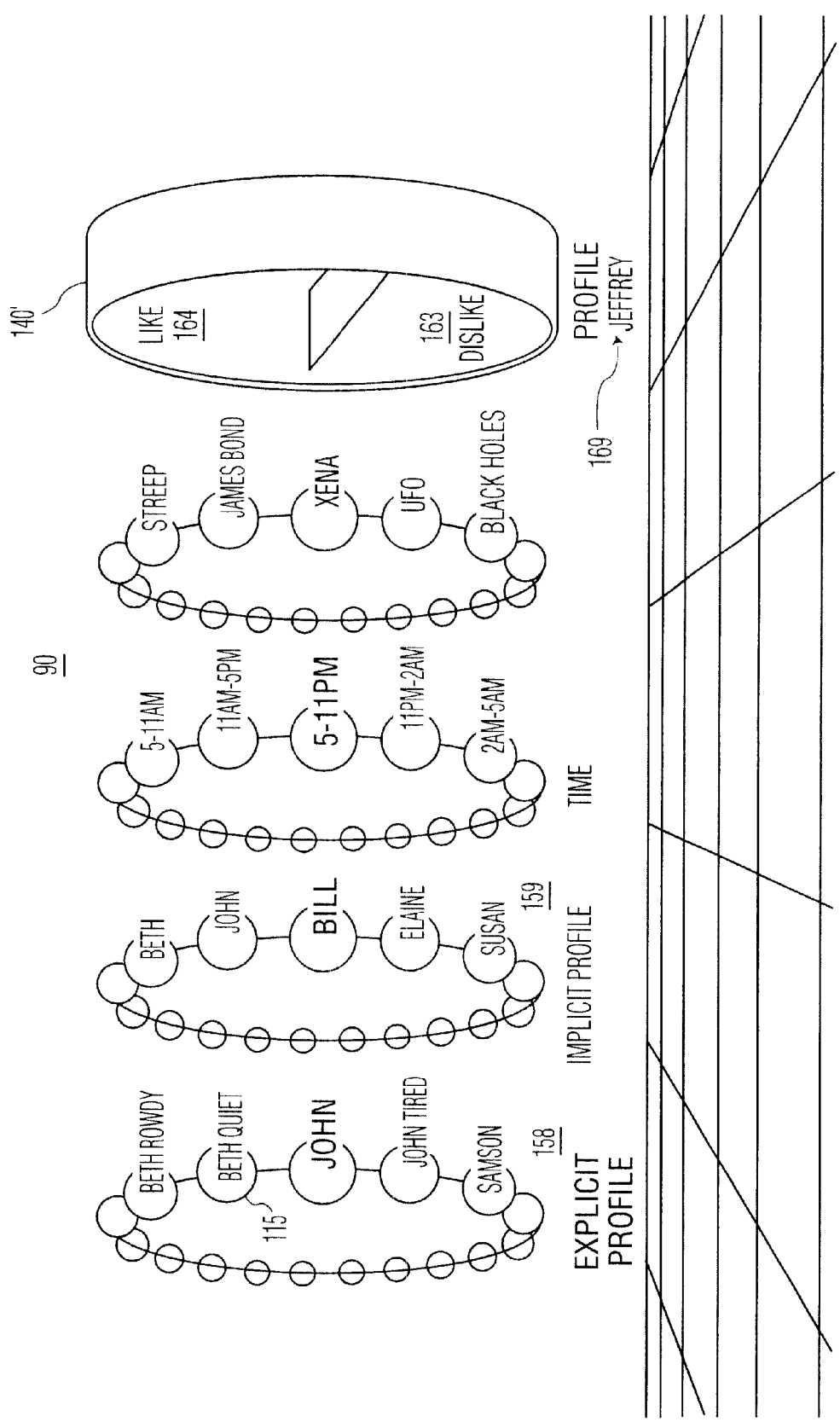
FIG. 7 is an illustration of a user interface for forming and editing user profiles where likes and dislikes are accommodated.

Referring now to FIG. 7, to create or edit a profile, the profile button 218 may be pressed at any time to invoke the profile mode. This brings up the profile mode UI element. The profile mode UI works the same way the search mode UI works, except that the profile bin 140' is a partitioned container with a "like" partition 164, where beads for criteria that are favored are placed, and dislike partition 165, where beads for criteria that are disfavored are placed. The location of the beads in the respective partition indicates the action created by the profile with respect to the beads. That is, a criterion, such as movies, in the dislike partition 165 will cause the profile to negatively weight negatively records matching the criterion. Similarly, a criterion in the like partition 164 will cause the profile to weight positively records matching the criterion. Note that the profile's name appears at 169 along with a label indicating the user is in profile mode. Note also that the beads can be given a score through a dialog box or by pressing a specialized star key multiple times to give the item a rating. For example, five stars could indicate an item that is highly favored and one star, an item that is strongly disfavored. To view the rating, the beads can be tagged with star icons, their colors can be changed to indicate the rating, their position in the bin can indicate the degree of the favored or disfavored rating, or their size can be changed. Thus, the user viewing the profile bin 140' would know at a glance the effect of each bead on the profile. The profile can be saved when the save button 222 is pressed. To select an existing profile for editing, the user has only to select the appropriate bead and press the GO button 214. To permit the deletion of a profile, the profile bead may be selected and the delete button 224 pressed.

To filter current channels through a profile, the user, in the profile mode, may select the profile and press the start button 228. In this way, the profile mode also acts as an advisor and the profile mode may be called a profile/advisor mode. Note that the implicit and explicit profiles can be reset using the reset key 226. Implicit profiles may be editable or non-editable, depending on the system used to store information. If the machine learning device used stores criteria-based inferences, then these could be edited exactly as discussed with respect to the explicit profiles. Alternatively, implicit profiles could be edited through the use of personality beads that weight different program according to a personality template represented by the personality bead. For example, beads like "movie nut" to emphasize movies and movie-related material, "quiet-type" to de-emphasize action/thriller sorts of content, or "overworked" to emphasize intellectually undemanding material, could be provided to tilt the implicit profile-one way or another. The same personality beads could be used in the search mode to make their actions effective only during a search, or incorporated in a saved search, or even incorporated in implicit profiles.

Figure 8:
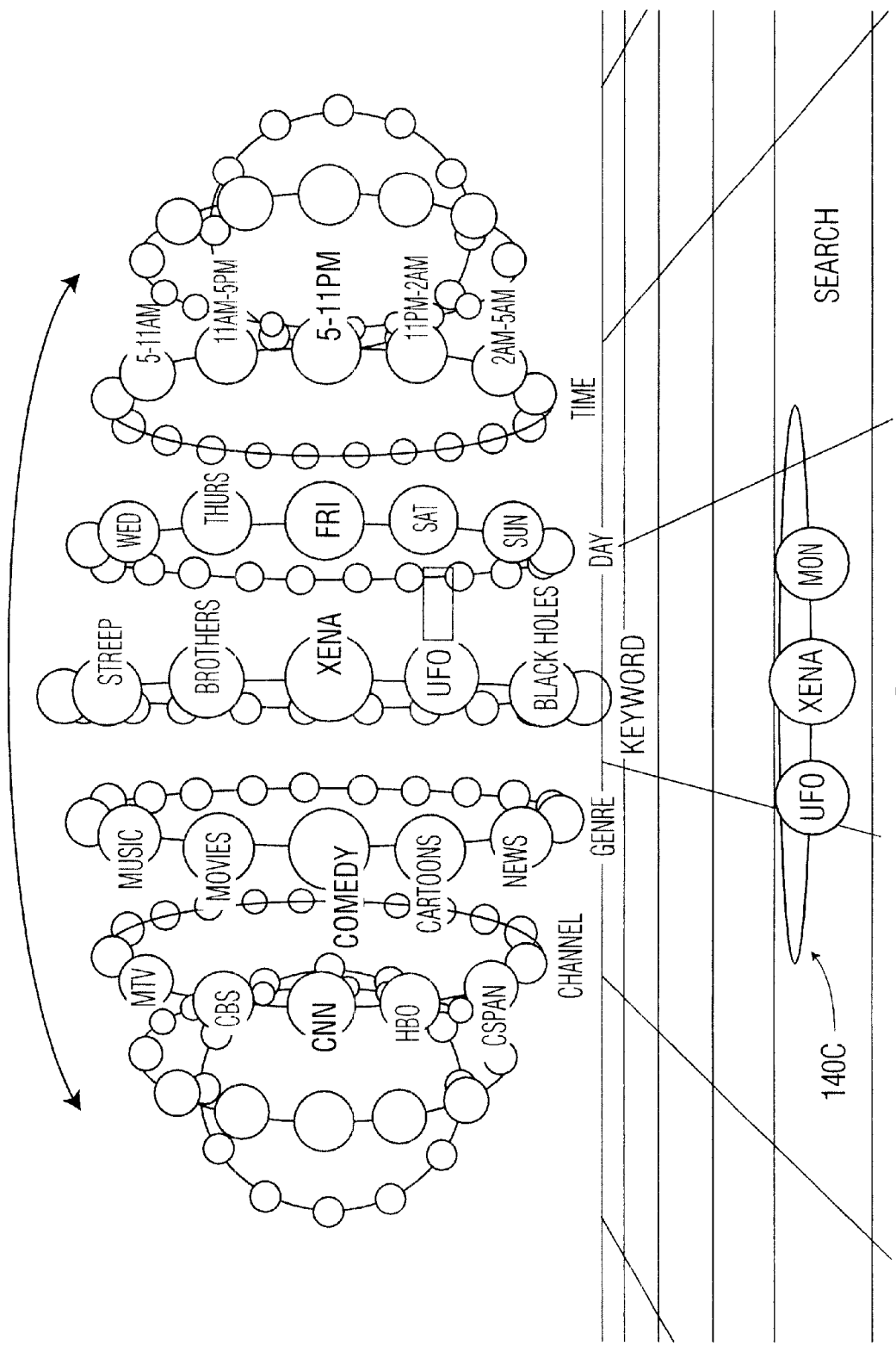
FIG. 8 is an illustration of an alternate pictorial scheme applicable to the embodiments of FIGS. 4–7.

Referring to FIG. 8, the search/profile mode can be implemented in a number of different ways in accord with the following ideas:

1. the use of three-dimensional pictures organizes the information in a way that reduces clutter and makes relevant information and controls handy (for example, much of the information that may be scrolled into view is shown partly hidden in the background, but it can be seen to suggest its existence and how to display it, for example beads on the string that are behind the front column of beads);
2. the more relevant information, depending on context, is shown in the foreground (for example, the currently selected items are shown in the foreground); and
3. temporarily hidden information (but which is available) retreats into the background (for example, the way additional beads on the string can be hidden in the background).

For example, the embodiment of FIG. 8 stems from the same design principles. In this embodiment, instead of the bead strings scrolling left and right in a straight line (like a cylinder), they roll about a vertical axis like a carousel. This way, there is one string that always at the center and closest to the observer in the 3-space scene. Here, the keyword string is selected since it is the one that is closest in the scene to the camera (user) vantage. Also, the search bin 140 is replaced with a string 140C.

Note that to exploit three-dimensional scene as a vehicle for partitioning or organizing information, the dimensions should be rendered in such a way that they are independent. Distributing variation along axes independently usually makes the scene asymmetric. Symmetrical 3-D forfeits the independence of the variegation by constraining the changes in appearance along one axis to be the same as the changes in the appearance along another axis. Thus, symmetry is hostile to the use of the three-dimensional scene as a device for organizing data visually. Of course, this does not mean symmetrical features always destroy the capacity for three-dimensional scenes to organize information effectively. For example, the bead tokens themselves are symmetrical. Also, even though the successive series of bead strings look the same, an example of translational symmetry, each successive bead string represents a different category. So on some level, symmetry may exist to provide visual clarity, but on another level, there is variegation that provides differentiation along the (visually) symmetric dimension.

Figure 9:
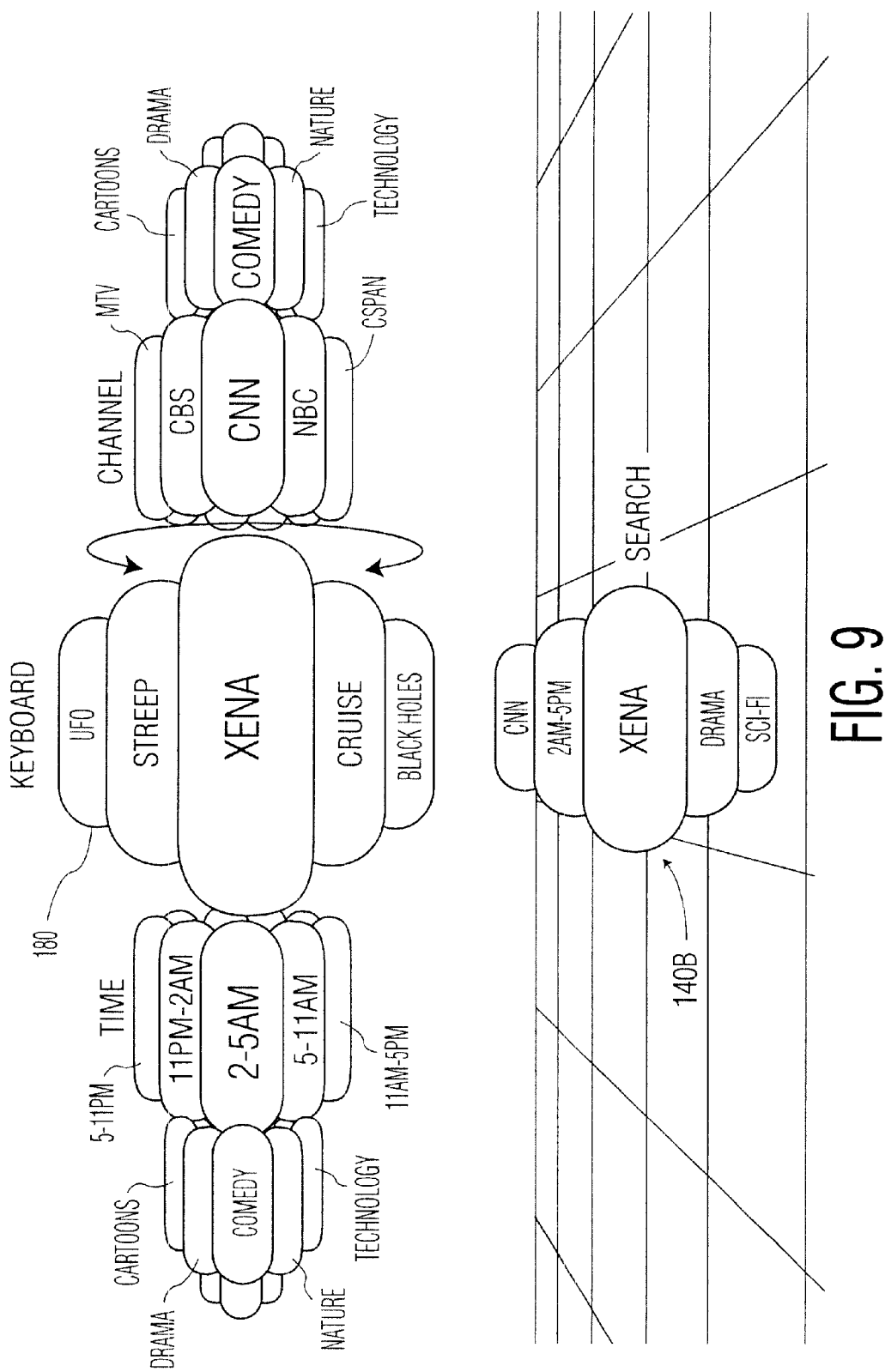
FIG. 9 is an illustration of another alternate pictorial scheme applicable to the embodiments of FIGS. 4–7.
Figure 10:
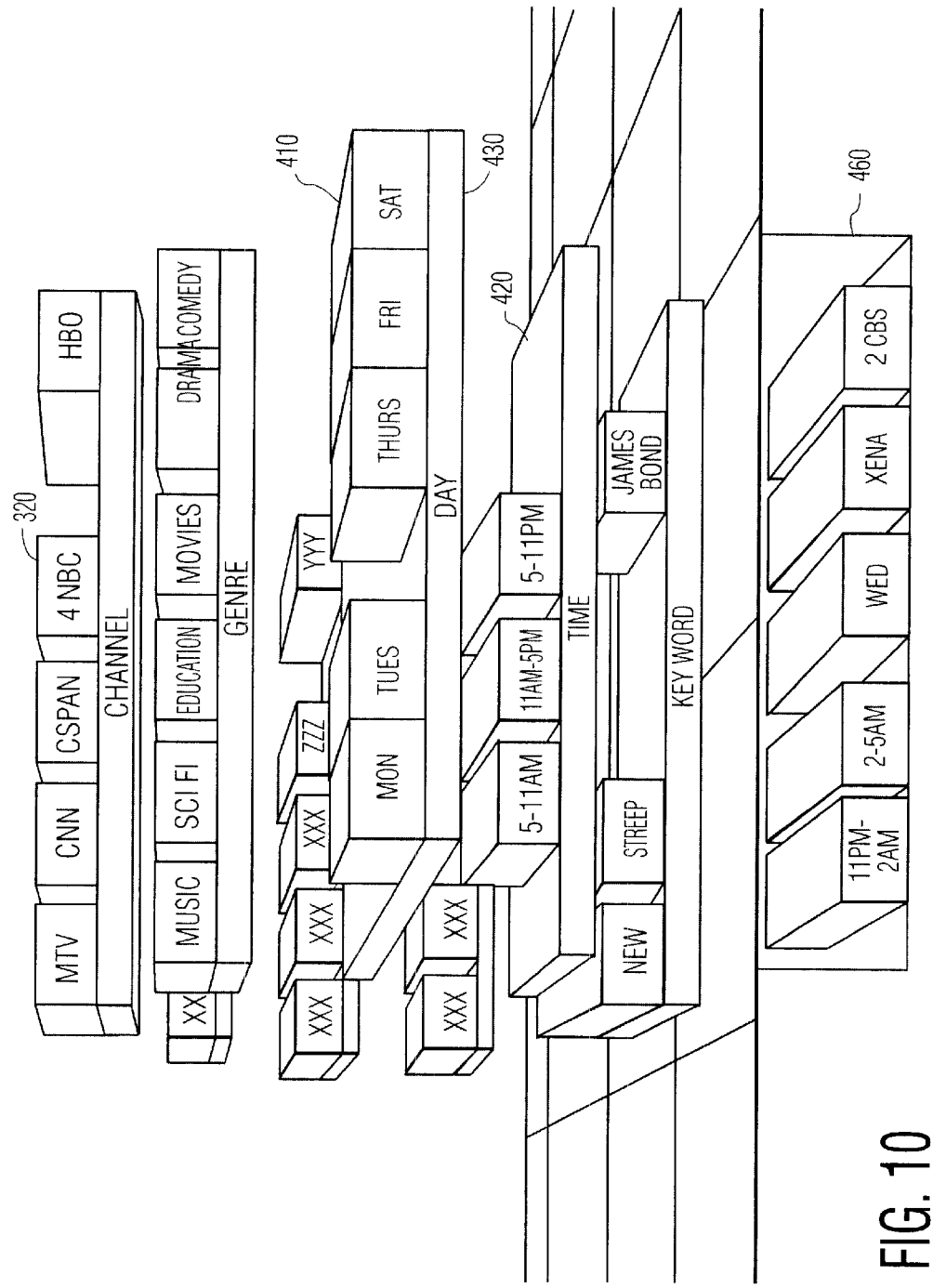
FIG. 10 is an illustration of yet another alternate pictorial scheme applicable to the embodiments of FIGS. 4–7.

Referring now to FIG. 9, still using the carousel concept, the bead strings are more stylized in this example. Only a few beads are visible in the front of each string, but the dominant bead on each string is a great deal more pronounced. Again the central string 180 is the selected one. Here the keyword string's selection is indicated by its size and bold lines. The search bin 140 is replaced by a string 140B. This scene geometry is preferred because it is uncluttered and would be easier to see superimposed on a broadcast image. It is clear how this geometry could be applied to the other contexts discussed with respect to Referring to FIG. 10, in still another example, the beads are replaced with boxes 410 sitting on shelves 420. The selected shelf 430 extends toward the user. The search bin 140 is replaced by a hole 460 into which selected boxes 330 are inserted. Here, the shelves rotate around an axis that is horizontal and in the plane of the page. Shelves and boxes further from the forward selected position (at 430) retreat into the background, for example, as shown at 320. A particular box on the selected shelf can be shown as selected by suitable highlighting, growing the box, bolding it, etc.

Figure 11:
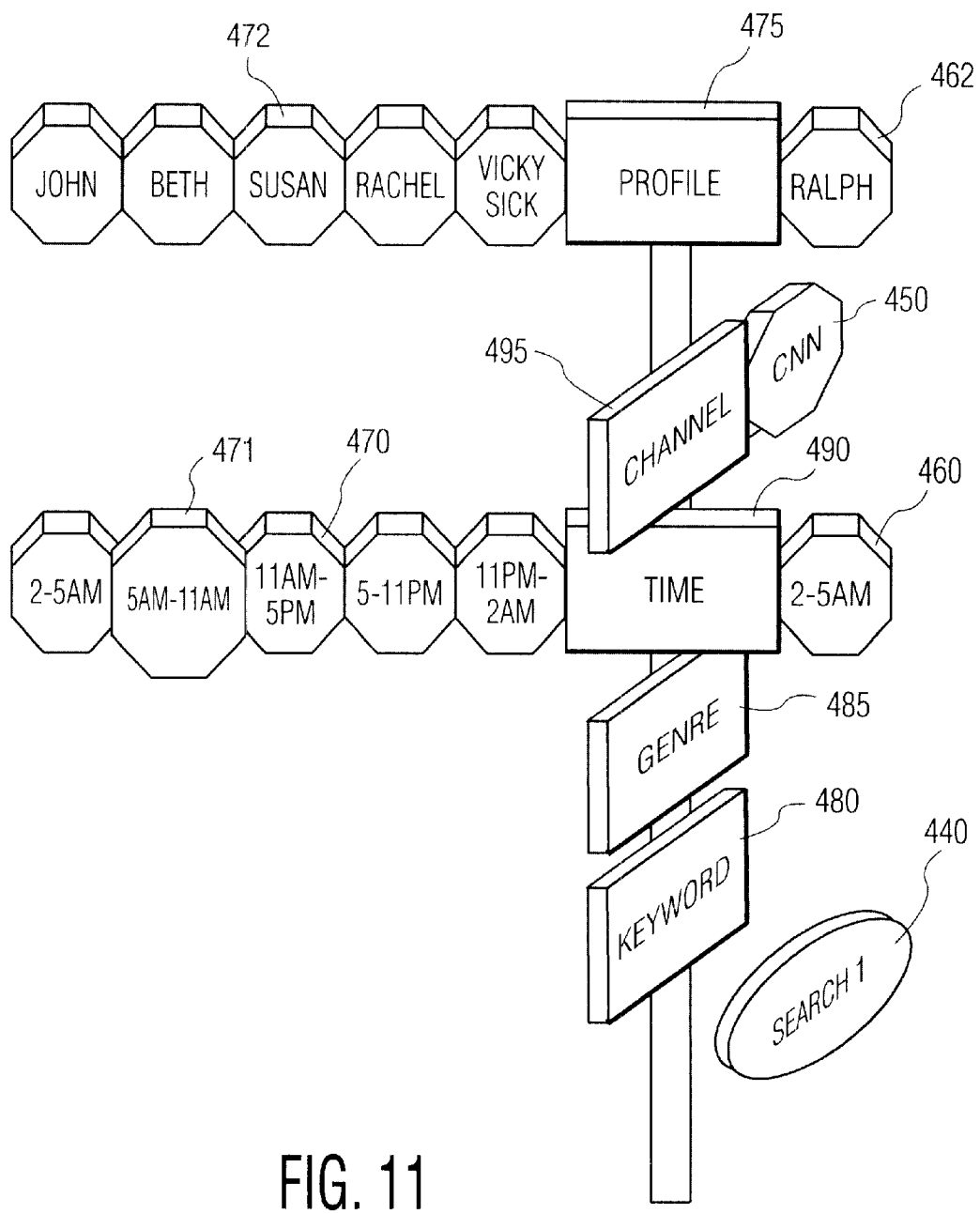
FIG. 11 is an illustration of yet another alternate pictorial scheme applicable to the embodiments of FIGS. 4–7.

Referring to FIG. 11, in still another example, signposts are used to represent the set of available categories, profiles, etc. Each sign represents a category or the set of profiles. Most of the signs 480, 485, and 450 are tilted at an angle with respect to the point of view, except for the selected one or ones 460, and 475. When a sign is selected, the selections available within the category are exposed as tags 470 and 472 on the left side of the sign. Those criteria or profiles that are selected to form part of a search (or criteria selected for a profile) are shown on the right side of the sign, for example as shown at 460 and 462. The name of the current search being constructed, if it is a search or the name of the profile if it is a profile under construction, appears at the bottom, for example, at 440. Thus, the array of selected criteria on the right of the signpost correspond to the contents of the search bin 140 in the bead embodiments discussed above. Navigation of the FIGS. 10 and 11 embodiments is analogous to navigation in the bead embodiments. Pressing the vertical cursor keys 232 causes the currently selected sign to swing into "open" position as is sign 490 in FIG. 11. Pressing the horizontal cursor keys 212 causes the tags 460/470 to be highlighted as indicated by bolding, color change, size change, etc. Tag 471 is shown as selected by a size and bolding change. Tags can be added and removed from the right side of the sign post by selecting them. Selecting a tag toggles its position between sides of the signpost. Once criteria are saved as a search, they can be made available by selecting them from their own "search" sign (not shown). Any criteria not visible on the signpost can be brought into view by scrolling vertically. New signs will appear at the bottom and top, respectively. New tags will appear at the left and right extremes.

A keyword list that may be used in all of the above embodiments can be generated dynamically, rather than from a generic template. Typically, keywords are entered by the user. However, the keyword list may also be culled from common terms in selections-made by the user or to reflect the user's category choices in building queries.

Figure 12:
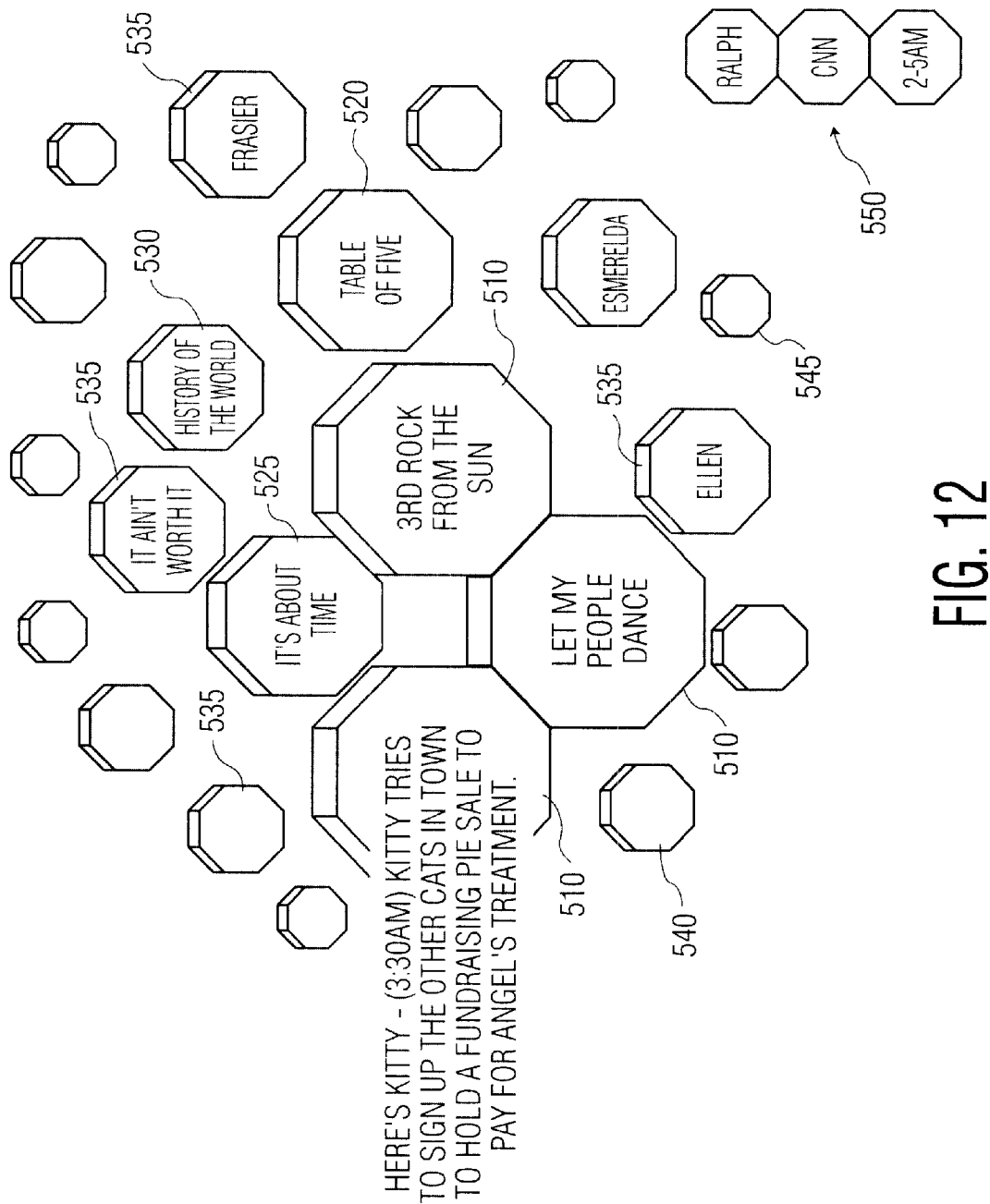
FIG. 12 is an illustration of a user interface for viewing and selecting records returned from a search of a database consistent at least some of the foregoing embodiments.

Referring to FIG. 12, once a search is invoked, the user sees the overview world. This view is invoked by pressing the start button 228 in search mode. Alternatively, an overview button may be provided on the remote control 210. The overview mode shows a visual representation that indicates pictorially, the relevance of each returned record by some metaphor for hierarchy. Each record returned by the search is displayed as a hexagonal tile in FIG. 12,For example, as shown in FIG. 12, the apparent proximity of the results relative to the viewer corresponds to the goodness of the fit between the search criteria and the record. Also, the record 510 is shown with bold lines, large overall dimensions, and bold text compared to the record 535. The more relevant results are located toward the center of the display as well. There is an element that indicates the criteria from which the current result display was generated at 530. The result tiles 510, 525, etc. can be navigated using the cursor keys 212, 232. Selecting a tile opens it up to reveal further information about the selected item. A tile representing a program "Here's Kitty" is shown selected at 510. Thus, additional information is shown for this selection.

Using the cursor keys, the user can navigate to the criteria element 510. In one embodiment consistent with FIG. 12, the vertical and horizontal cursor keys 212, 232, are used to move the cursor about the X-Y projection plane (the plane of the screen, where the Z-axis is pictorial axis leading from foreground to background) so that any icon can be accessed using the two axes of movement. In an alternative embodiment, the cursor keys 212, 232 are used to move along the Z-axis so that the background tiles come closer to the user and more information becomes visible when they do. In this embodiment, Z-axis control can be toggled on and off or one set of cursor keys, say the vertical cursor keys 214, may be used to move forward and backward along the Z-axis the other set, among the current foreground set of tiles. When going in the foreground-to-background direction, the current foreground set of tiles disappears as if it moved behind the viewer.

Selecting the criteria element, by pressing the GO button, 214 causes the display to change back to the search mode with the current search (the one indicated by the criteria element) loaded into the search bin 140 (or the corresponding element for the other embodiments). This permits the search to be edited easily.

Figure 13:
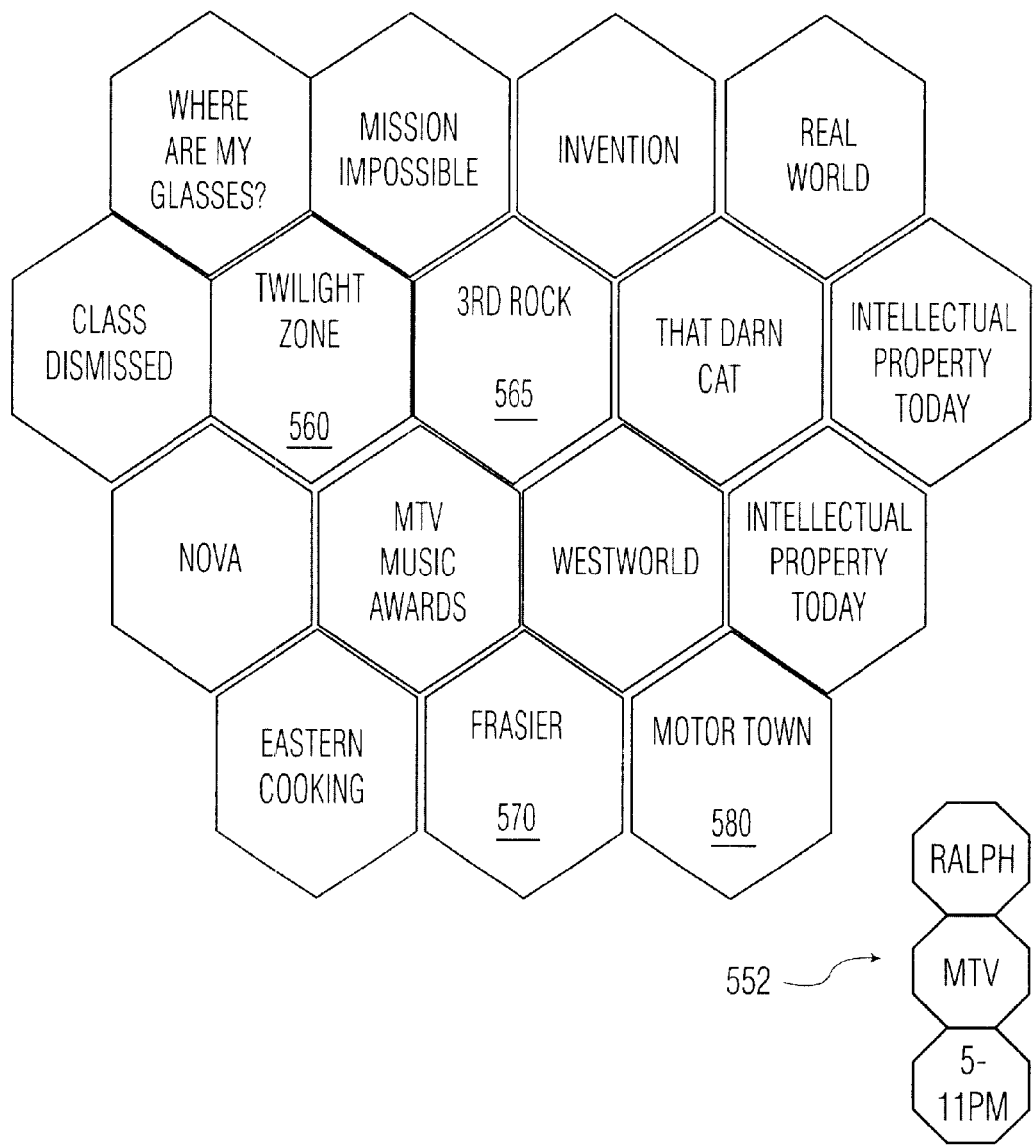
FIG. 13 is an illustration of another user interface for viewing and selecting records returned from a search of a database consistent with at least some of the foregoing embodiments.

Referring now to FIG. 13, the results are displayed in a fashion similar to that of FIG. 12, except that the third dimension displacement element is not applied. That is, the less relevant records are further from the center and less bold, but they do not appear to recede into the background as in the FIG. 12 embodiment. Other features are essentially the same as that of the FIG. 12 embodiment.

Figure 14:
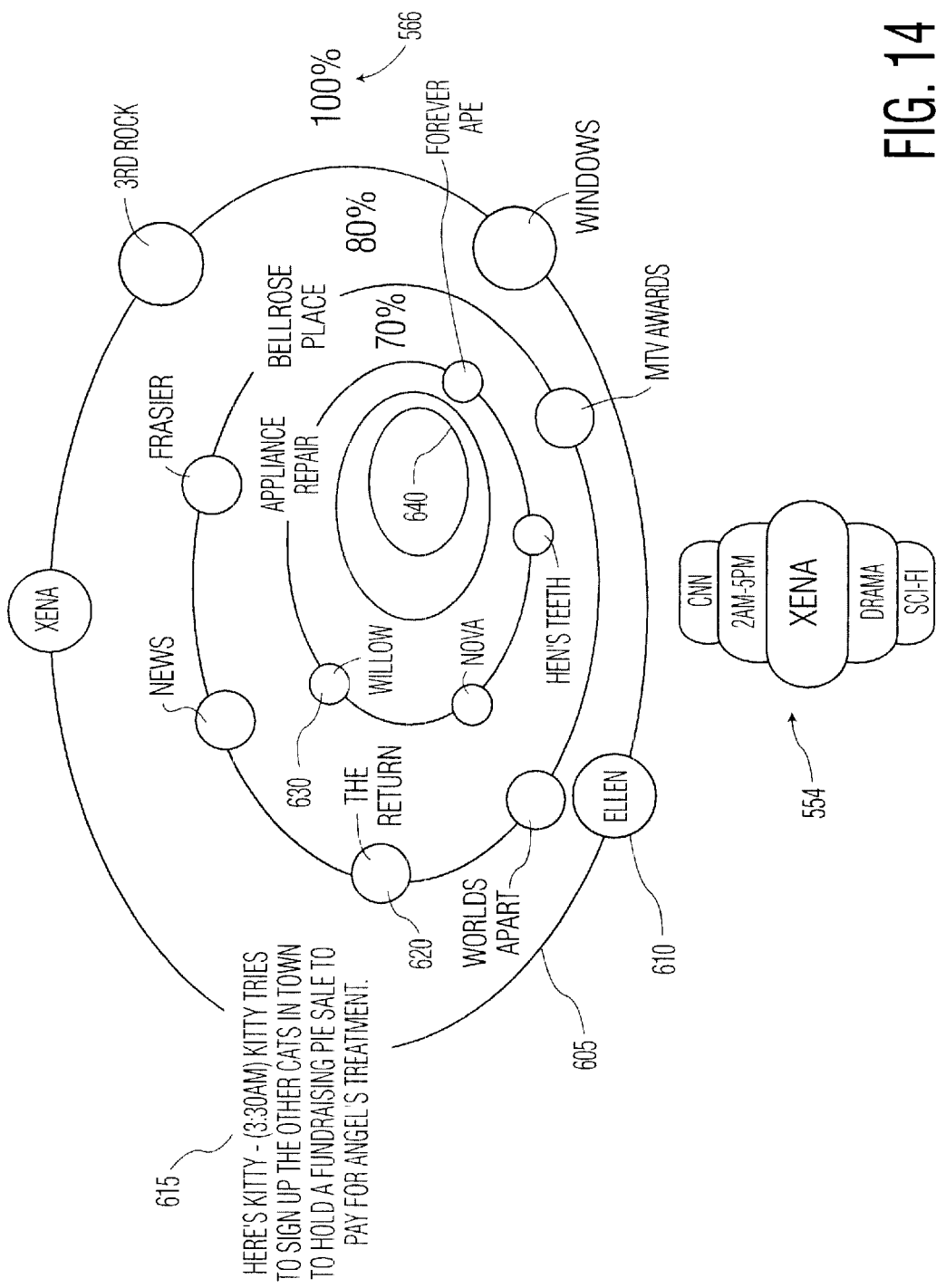
FIG. 14 is an illustration of yet another user interface for viewing and selecting records returned from a search of a database consistent with at least some of the foregoing embodiments.

Referring now to FIG. 14, the results of a search are organized around substantially concentric rings 605. Each record appears as a bead or token 610, 620, 630. The rings 605 are intended to give the appearance of a tunnel going back away from the viewer. The horizontal cursor keys 232 may be used to rotate the currently selected token (Token 605 is the selected token in FIG. 14). The vertical cursor keys 212 may be used to move along the Z-axis, that is, move through the tunnel bringing the background rings into the foreground. As the rings 605 move forward (the viewer advances along the Z-axis), the tokens 610, 620, 630, come closer to the viewer and get bigger. As they get bigger, more information may be revealed so that, for example, the title gives way to a summary, which gives way to a detailed description. Alternatively, other media types may be invoked, such as audio, video, screen caps (thumbnails), etc. These are applicable to all the embodiments described herein.

Here, as in the earlier embodiments, the selection element 554 provides a visual reminder of the selection criteria that produced the current result display and a mechanism for moving back to the relevant search mode to edit the criteria. Again, suitable navigation keys can be provided to allow for fast access to any of these features. Each ring may be associated with a match-quality level that may be shown on the screen as at 566.

Figure 15:
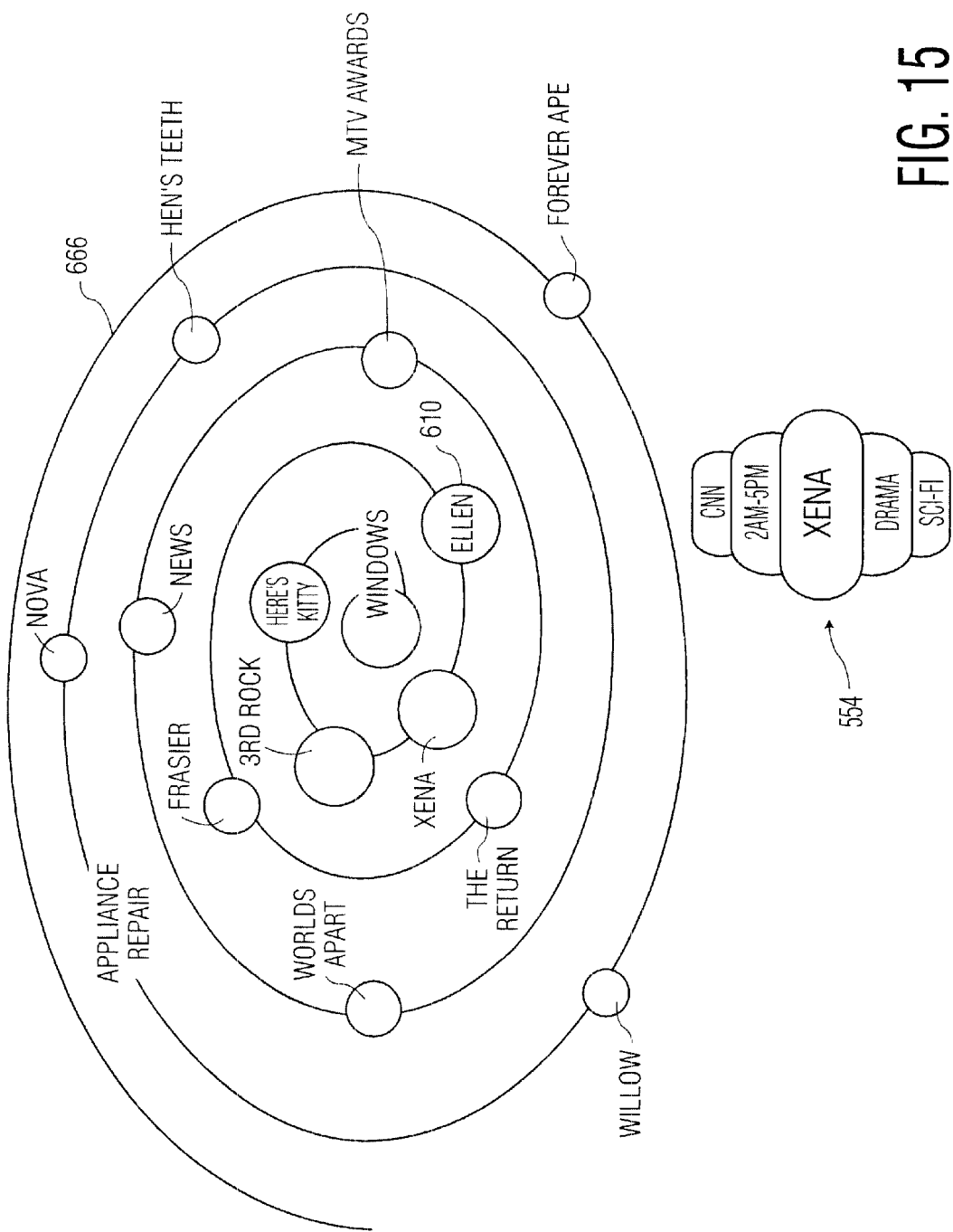
FIG. 15 is an illustration of yet another user interface for viewing and selecting records returned from a search of a database consistent with at least some of the foregoing embodiments.

Referring to FIG. 15, this embodiment of an overview world scene is similar to that of FIG. 14, except that the tokens are organized around a spiral 666 rather than rings. This arrangement is essentially one-dimensional so that only one set of cursor keys needs to be used to navigate it. Navigation may or may not be attended by movement along the Z-axis, as preferred.

Figure 16A:
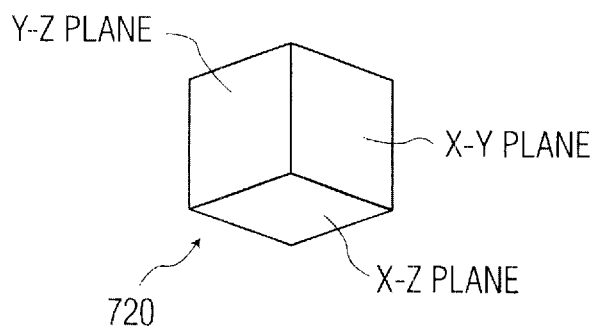
FIG. 16A illustrates the plane definitions that apply to the embodiment of FIG. 16B.
Figure 16B:
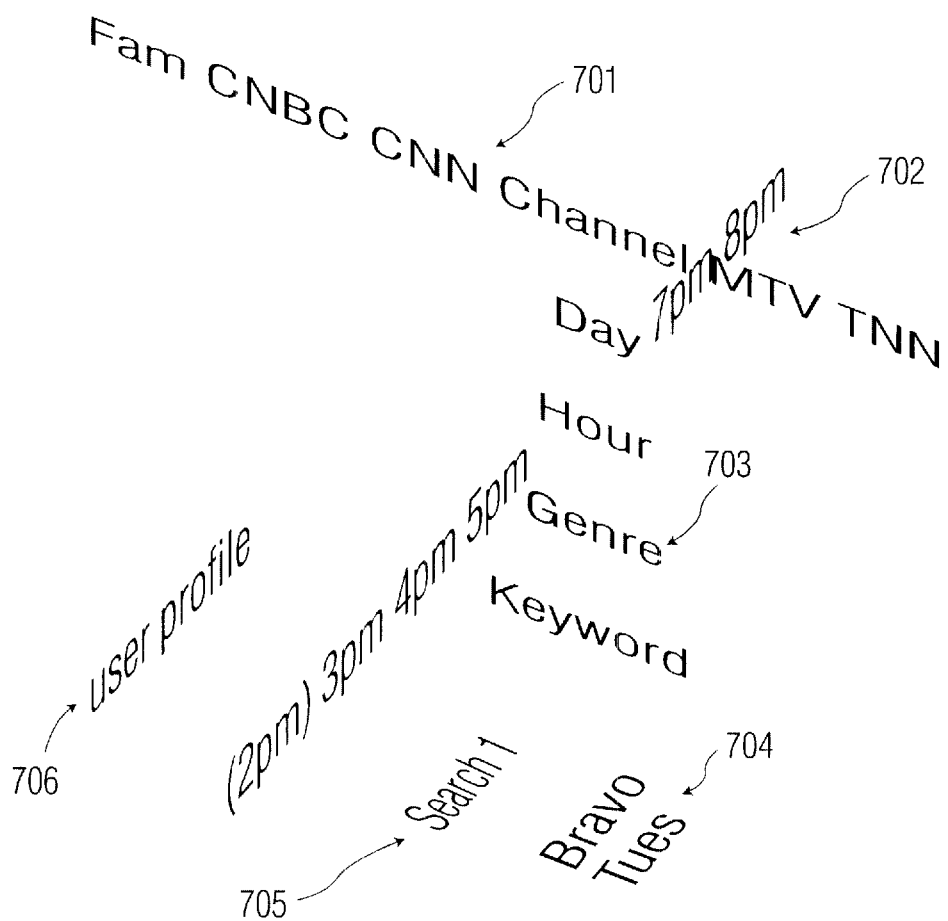
FIG. 16B is an illustration of another user interface for forming and editing search queries and user profiles in which text is used to represent objects in a 3-D scene employed by the user interface.
Figure 17:
FIG. 17 illustrates a text-based search result viewing scene that also uses text as objects in a 3-D scene.

Referring to FIG. 16A, a purely text embodiment makes use of the three-space visualization to separate the different portions of the display. The diagram shows the definition of the three planes and axes. Referring now also to FIG. 16B, in the UI represents categories 703 distributed along the Y-axis and the category selections 701 broken out in the X-Y plane and distributed along X-axis. Time 702 is shown along the Z-axis. The user profile 706 is shown in the Y-Z plane. The search title 705 and its elements 704 are shown in the X-Z plane. Selected items are shown in brackets. The role of the search bin 140 is played by the xz plane as shown at 704 and 705. Referring now also to FIG. 17, the results of searches may be represented as text icons in a three-dimensional landscape scene. The foreground title is the most relevant as indicated by the relevancy scale 814 in the Y-Z plane. The less relevant results 802, 803 appear in order of relevancy progressively along the Z-axis away from the viewer. The brackets 817 around the most relevant record indicate that this record is currently selected. A selected record may reveal detailed information about the record, for example as shown at 804. The details may include a thumbnail picture or video. The details may include a thumbnail picture or video (not shown). The revealing of further detail, the zoomed-in state, can be invoked by a separate operation so that selection does not necessarily cause the display of additional information about the selected item. This applies to all embodiments. The cursor keys may be used to scroll back toward the less relevant records and to highlight each record in turn.

In each of the above embodiments, one or more of the categories may actually be constructed of words or other symbols, for example, the keyword category described above. Keywords could be every conceivable word in the dictionary, which would make selection of keywords difficult without a keyboard (physical keyboard or on-screen equivalent). Keyboards are tedious and it is preferred if keywords can simply be selected from, for example, a category string as discussed above.

Such a keyword category may be constructed using data from various sources to cull from the vast number of alternatives, those words that would be useful in a keyword selection list. The words can be extracted from the descriptions of chosen records and/or from records returned by the queries based on frequency of occurrence or a variation thereof.

Figure 18:
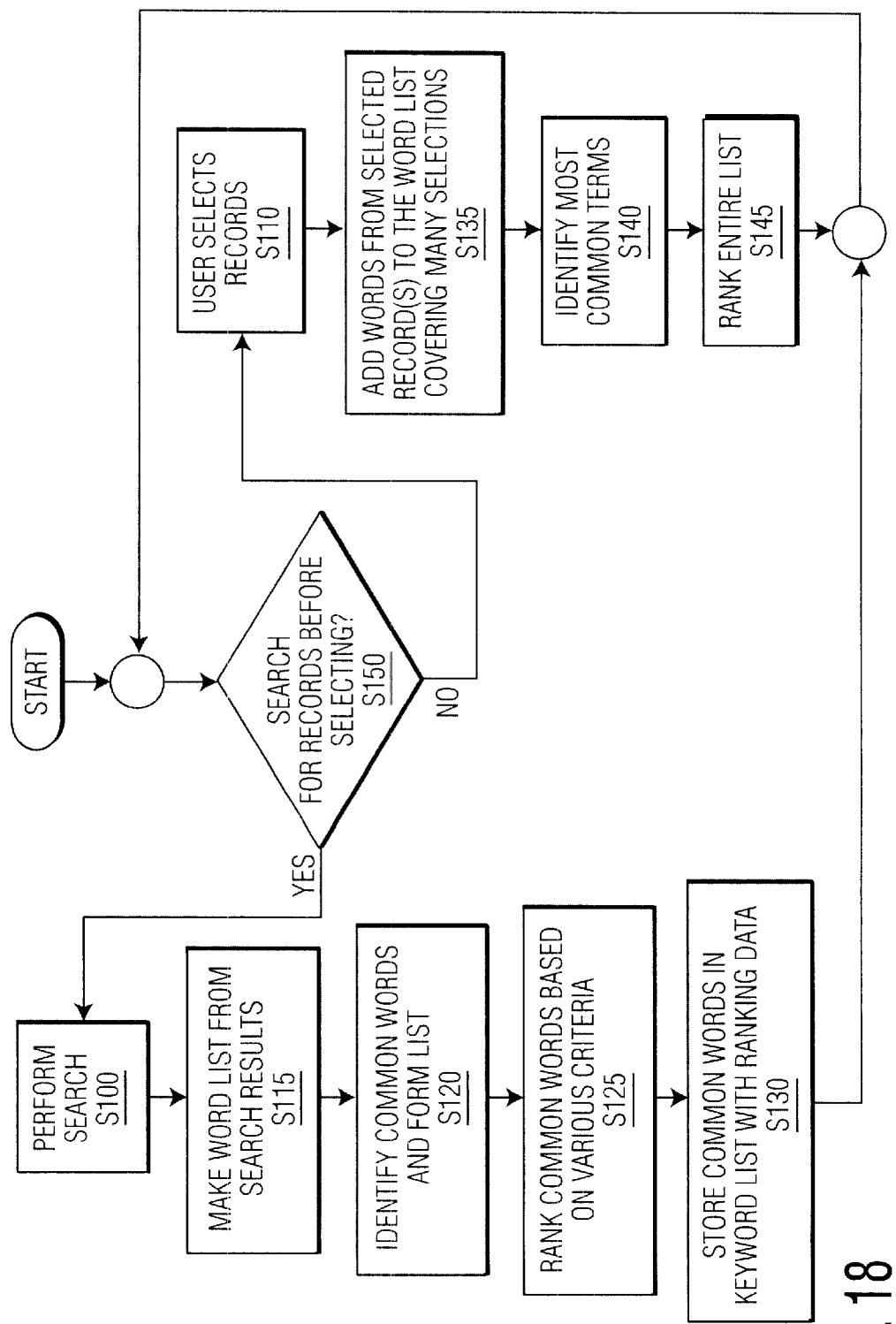
FIG. 18 is a flow chart illustrating processes for keyword category generation and sorting.

Referring to FIG. 18, a user accesses the records of the database directly or by searching. Directly accessing records of the database could correspond, for example, to the browsing and selection of a record by a user. Searching may be performed as discussed above. The user does one or the other and the path is selected in step S150. If a search is performed (step S100) records may be a word list is constructed from the search results in step S115. Some or all words from the titles, descriptions, contents of the records etc. could be culled from the search results depending on the capacity of the system and the desires of the designer. Less relevant words, based on grammatical parsing, could be filtered out of the list. For example, the list could be formed from only direct objects and subjects from sentences in the description and title words. Once the list is formed, the most common words in the list may be identified (S120) and ranked (S125) based on frequency of occurrence and significance (e.g., title words are more significant the words from the description or the content of the record itself). Other criteria may be used for selecting and ranking the words added to the list, for example, the goodness of fit between the search criteria and the retrieved records. The above are mere suggestions. The criteria used would depend on the type of database accessed. For example, some records may contain many different specialized fields such as assignee, inventor, and filing date of a patent, that characterize the records that provide significance information explicitly. The common words that remain at the top of the list in terms of significance and frequency become part of the list along with their respective ranking data and the process is repeated each time searches are made. Repeated searches may build the list, but the list will always remain sorted with the most important items at the top. Using the user interface designs described above, the most important keywords will always appear on the screen and the least important ones will be available by scrolling, or rolling, the bead string (or other corresponding element). In this way the interface remains uncluttered while still providing access to a large inventory of keywords.

If the user chooses to simply select records without searching, the word list can be formed from multiple selections and common words culled from this list in a manner similar to that for searches. In step S110, one or more records are selected by the user. Step S110 can be reached directly without searching or by going through the steps S100-S130 first and then through S150 again to arrive at S110 to choose one or more records from the search results. In step S135, the user adds words from the selected record or records to the word list. To identify frequency of hits data on descriptors, it desirable to have multiple records, so each selection is added to a single list and the frequency data derived from the combined list, which covers multiple selection iterations. Alternatively, if a large number of records are selected at once, frequency data can be obtained from these selections. The addition of words to the list may involve the same filtering and sorting steps discussed above with respect to the words culled from the search results. In step S140, words with a low frequency of hits may be filtered out of the list. In step S145, all the terms are ranked according to the various criteria discussed above. Note that the word lists derived from retrieved records from a search and those derived from selected records can be combined in a single list.

Preferably, the keyword list should be editable by the user in the same fashion as described in detail with respect to the editing of profiles elsewhere in the specification. To construct a keyword list based on frequency of use data, the system could start with no keywords at all. Then, each time the user enters a query, the returned results could be scanned for common terms. The titles, descriptions, or any other data could be scanned and those terms that occur with some degree of frequency could be stored in a keyword list. The keywords in the list could each be ranked based on frequency or frequency weighted by the context in which the keyword appeared. For example, a keyword in a title might receive a lower rank than a keyword in a description or a keyword that is a direct object or subject in a grammatical parsing of a sentence in a description might receive a higher ranking than indirect objects, etc. Instead of extracting keywords from the returned records of a search, the keywords could be extracted from only the records selected for use. For example, only programs that are chosen for viewing or recording are actually used to form the keyword list in the manner described. Alternatively both selections and returns of queries could be used, but the keywords in the selected records could be weighted more strongly than keywords in other returned records. This shorter list can then be ranked using the same or similar method as used to from would be awkward.

Where the strings represent criteria, the ranking of criteria in each category may correspond to the frequency with which the criteria are used by the user in constructing queries. So, for example, if the user's searches always include the daytime time range, the bead or beads corresponding to this time range would be ranked higher. Alternatively, the criteria may be ranked according to selected records, rather than by all the records (or at least the most highly ranked ones) returned by searching.

Note that many of the above techniques can be used with other types of user interfaces and are not limited to the designs described, which are preferred embodiments. So, for example, the keyword list could be used with a purely textual computer interface.

In keeping with the design philosophy around which the user interface is developed, it is desired that only a small number of highly relevant criteria be visible on the screen at a given time. Across all categories, the frequency with which the user selects a given criterion is preferably be used to rank the criteria in order of importance. Thus, although a television database describes content on more than 100 channels, if only 5 of those channels are routinely entered in search queries, those 5 channels should be, by default, the ones displayed in the most foreground or prominent position on the display. The other criteria are still accessible, but the interface does not innocently provide the user with equal access to all. That is one of the basic ideas that leads to simple interfaces.

Note that prioritization of the search criteria categories may also be made editable by the user. For example, if a channel has fallen temporarily into disfavor judging by frequency of use during the Olympics, the user may provided a mechanism to revive it. This may be any of various techniques, for example invoking a menu option to resort the list representing the ranking of selected category's elements, and does not need to be described in detail.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of generating a user interface for searching a database, comprising the steps of:

ranking search criteria, each variously characterizing records in said database, according to a measure of utility of said criteria for searching, to produce a ranked list;

displaying a respective symbol corresponding to a highest ranking one of said ranked list such that it is more conspicuous than a respective symbol corresponding to at least one lower ranking one of said ranked list;

permitting a selection by a user of at least one of said highest ranking one of said ranked list and said at least one lower ranking one of said ranked list to form a selection set;

submitting a search query responsive to said selection set to said database, wherein said step of displaying includes generating a projection of a three-dimensional scene and displaying said respective symbol corresponding to a highest ranking one of said ranked list in a foreground of said scene and displaying said respective symbol corresponding to at least one lower ranking one of said ranked list in a background of said scene.

2. A method as in claim 1, wherein said step of permitting includes highlighting of at least one of said respective symbols.

3. A method as in claim 1, wherein said measure of utility includes a frequency of previous selections of said search criteria, whereby said ranking is responsive to a frequency with which said search criteria are used.

4. A method as in claim 1, wherein said step of displaying includes generating a projection of a three-dimensional scene and displaying said respective symbols connected by a three-dimensional axis.

5. A method as in claim 1, wherein said step of displaying includes displaying said respective symbol corresponding to a highest ranking one of said ranked list in a first region of a display and displaying said respective symbol corresponding to at least one lower ranking one of said ranked list in a second region of a display.

6. A method of generating a user interface for searching a database, comprising the steps of:

providing a set of search terms ranked by frequency of use;

displaying said search terms so that those terms that are more frequently used appear in a prominent position on a display screen and those terms that are less frequently used are accessible through a user interface, but not as prominently displayed until accessed;

accepting a selection of at least one of said search terms through said user interface to perform a search of said database;

modifying a rank of said set of search terms responsively to a result of said step of accepting, wherein said step of displaying includes generating a projection of a three-dimensional scene and displaying said search terms that are more frequently used in a foreground of said scene and first displaying said terms that are less frequently used in a background of said scene.

7. A method as in claim 6, wherein said step of displaying includes displaying said search terms that are more frequently used in a first location on a display and displaying said terms that are less frequently used in another location on said display.

8. A method as in claim 6, wherein said step of displaying includes generating a projection of a three-dimensional scene and displaying said search terms connected by a three-dimensional axis.

9. A method as in claim 6, wherein said step of displaying includes generating a projection of a three-dimensional scene and displaying said search terms connected by a cylindrical axis.

10. A device for of generating a user interface for searching a database, comprising:
- a data store holding ranked list of search criteria, each variously characterizing records in said database, the ranking being according to a measure of utility of said criteria for searching;
- a display, user input device, and a controller to be controlled by said controller;
- said controller being programmed to display, on said display, a respective symbol corresponding to a highest ranking one of said ranked list such that it is more conspicuous than a respective symbol corresponding to at least one lower ranking one of said ranked list;
- said controller being programmed to permit a selection, by a user, of at least one of said highest ranking one of said ranked list and said at least one lower ranking one of said ranked list to form a selection set;
- said controller being programmed such that said display of a respective symbol corresponding to said highest ranking one of said ranked list such that it is more conspicuous than said respective symbol corresponding to at least one lower ranking one of said ranked list includes a projection of a three-dimensional scene where said respective symbol corresponding to a highest ranking one of said ranked list is in a foreground of said scene and said respective symbol corresponding to at least one lower ranking one of said ranked list is in a background of said scene;
- submitting a search query responsive to said selection set to said database.

11. A device as in claim 10, wherein said controller is programmed to highlight said symbol corresponding to said selection by said user.

12. A method as in claim 10, wherein said measure of utility includes a frequency of previous selections of said search criteria, whereby a ranking of said ranked list is responsive to a frequency with which said search criteria are used.

13. A method as in claim 10, wherein said controller is programmed such that said display of said respective symbols includes a projection of a three-dimensional scene where said respective symbols are displayed connected by a three-dimensional axis.

14. A method as in claim 10, wherein said controller is programmed such that said display of a respective symbol corresponding to said highest ranking one of said ranked list such that it is more conspicuous than said respective symbol corresponding to at least one lower ranking one of said ranked list includes first and second regions where said respective symbol corresponding to a highest ranking one of said ranked list is in said first region and said respective symbol corresponding to at least one lower ranking one of said ranked list is in said second region.

15. A device for permitting the submission of search queries to a controller for searching a database, comprising:
- a controller with a display and an input device; said controller being connected to control said display and said input device;
- a store holding criteria for selective inclusion in said search queries;
- said controller being programmed to display a list of symbols representing said criteria on said display such that frequently-used criteria are displayed differently from less-frequently-used criteria, said controller being programmed to accept at least one command from said input device to generate a search query responsively thereto, and said controller being programmed to display said frequently-used criteria and said less-frequently-used criteria as symbols in a three-dimensional scene, said symbols corresponding to said more frequently-used criteria are in a foreground of said scene and said symbols corresponding to said less frequently-used criteria are in a background of said scene.

16. A device as in claim 15, wherein:
- said controller is further programmed to effect selection of said criteria through said input device by accepting a corresponding number of commands;
- said controller is further programmed such that said corresponding number of commands to select said frequently-used criteria is fewer than said corresponding number of commands to select said less-frequently-used criteria.

17. A device as in claim 15, wherein: said controller is further programmed to display said frequently-used criteria as symbols that are larger than symbols corresponding to said less-frequently-used criteria.

18. A device as in claim 15, wherein said controller is further programmed to display said symbols connected by a three-dimensional axis.

19. A device as in claim 15, wherein: said controller is further programmed to display said frequently-used criteria as symbols that are more prominent than symbols corresponding to said less-frequently-used criteria.

20. A device for permitting the submission of search queries to a controller for searching a database, comprising:
- a controller with a display and an input device; said controller being connected to control said display and said input device;
- a data store holding criteria for selective inclusion in said search queries, said criteria in said store having respective ranks;
- said controller being programmed to accept said commands through said input device to select certain ones of said criteria for inclusion in a search query;
- said controller being programmed to update said respective ranks responsively to said commands;
- said controller being programmed to display frequently-used criteria and less-frequently-used criteria as symbols in a three-dimensional scene, said symbols corresponding to said more frequently-used criteria are in a foreground of said scene and said symbols corresponding to said less frequently-used criteria are in a background of said scene.

21. A device as in claim 20, wherein said controller is further programmed to display said symbols connected by a three-dimensional axis.

* * * * *